(12) United States Patent
Hamaguchi

(10) Patent No.: US 8,244,035 B2
(45) Date of Patent: Aug. 14, 2012

(54) IMAGE PROCESSING APPARATUS AND CONTROL METHOD THEREOF

(75) Inventor: Jun Hamaguchi, Tokyo (JP)

(73) Assignee: Canon Kabushiki Kaisha (JP)

( * ) Notice: Subject to any disclaimer, the term of this patent is extended or adjusted under 35 U.S.C. 154(b) by 919 days.

(21) Appl. No.: 12/169,901

(22) Filed: Jul. 9, 2008

(65) Prior Publication Data

US 2009/0016647 A1 Jan. 15, 2009

(30) Foreign Application Priority Data

Jul. 10, 2007 (JP) ................................. 2007-181446

(51) Int. Cl.
*G06K 9/34* (2006.01)
*G06K 9/36* (2006.01)
(52) U.S. Cl. .................... 382/173; 382/180; 382/284
(58) Field of Classification Search .......... 382/173–177, 382/180, 276, 284, 293, 305
See application file for complete search history.

(56) References Cited

U.S. PATENT DOCUMENTS

| | | | |
|---|---|---|---|
| 5,555,362 A * | 9/1996 | Yamashita et al. | 715/209 |
| 6,289,121 B1 | 9/2001 | Abe et al. | |
| 7,616,216 B2 * | 11/2009 | Yamakado et al. | 345/589 |

FOREIGN PATENT DOCUMENTS

| | | |
|---|---|---|
| JP | 3127169 A | 5/1991 |
| JP | 8320914 A | 12/1996 |
| JP | 10-247237 A | 9/1998 |
| JP | 11-15826 A | 1/1999 |

OTHER PUBLICATIONS

Japanese Office Action for corresponding JP 2007-181446, dated Oct. 7, 2011.
English translation of Japanese Office Action to corresponding JP 2007-181446, cited in an IDS dated Nov. 7, 2011.

* cited by examiner

*Primary Examiner* — Yon Couso
(74) *Attorney, Agent, or Firm* — Rossi, Kimms & McDowell LLP

(57) ABSTRACT

Each page image of image data including a plurality of pages is divided into a plurality of areas by block selection, and meta information associated with at least one of the coordinate position, size, and type of each of the plurality of areas is held. As a combining condition, at least a direction to retrieve areas to be combined is set, area combining processing for combining two or more areas which satisfy the combining condition of the plurality of areas of the image data into one area is executed, and information associated with the areas of the image data including the combined area is stored.

7 Claims, 24 Drawing Sheets

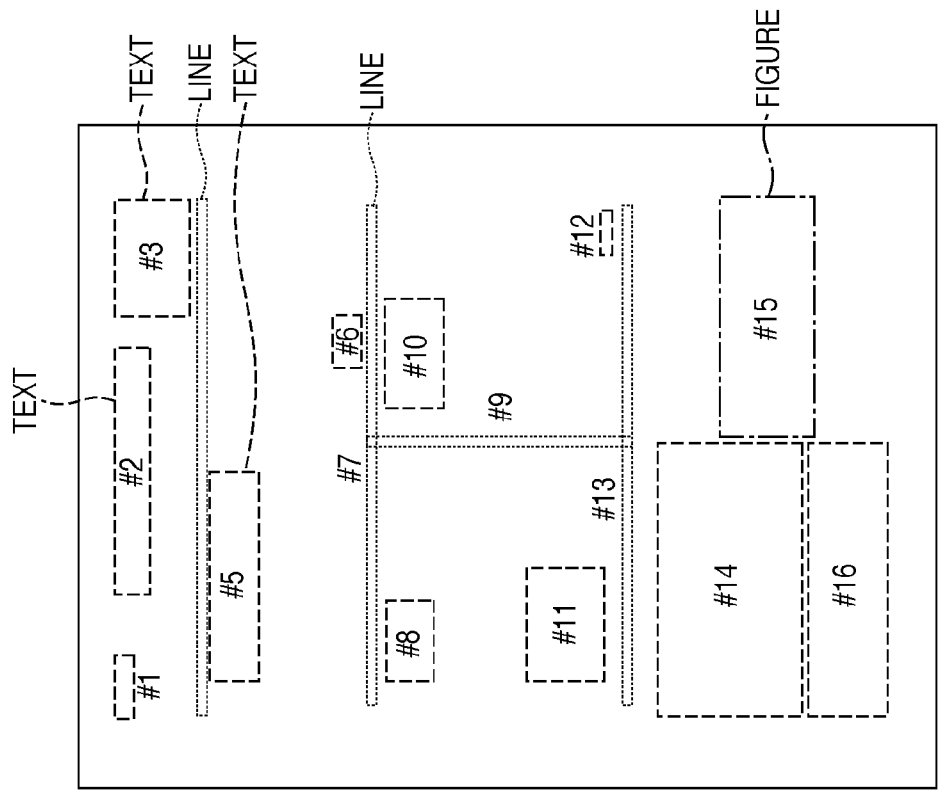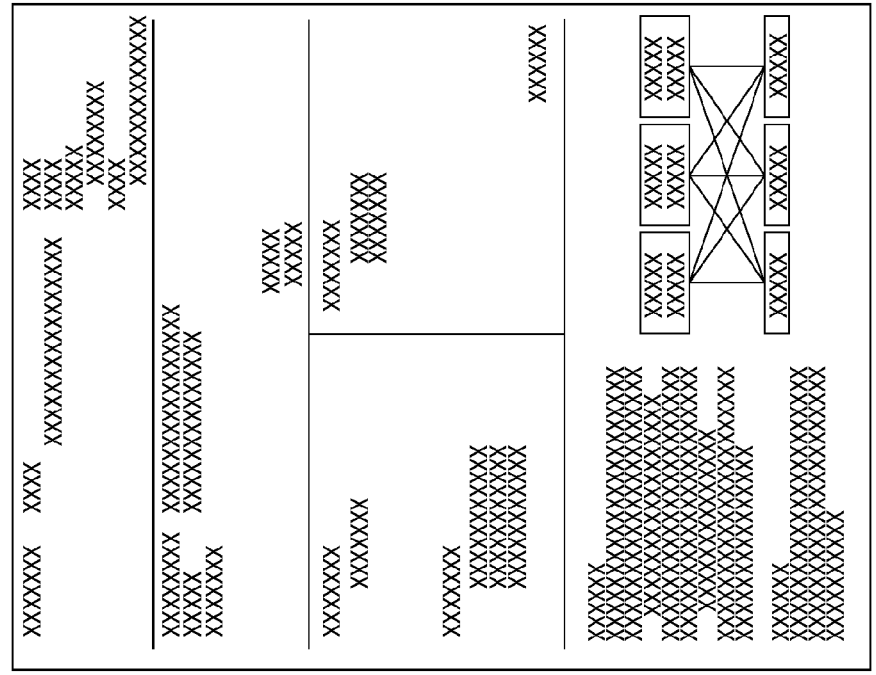

FIG. 7A

BLOCK INFORMATION

| Page \ Block | TYPE | COORDINATE X | COORDINATE Y | WIDTH W | HEIGHT H | OCR INFORMATION |
|---|---|---|---|---|---|---|
| BLOCK 1-1 | 1 | X1-1 | Y1-1 | W1-1 | H1-1 | AVAILABLE |
| BLOCK 1-2 | 1 | X1-2 | Y1-2 | W1-2 | H1-2 | AVAILABLE |
| BLOCK 1-3 | 1 | X1-3 | Y1-3 | W1-3 | H1-3 | AVAILABLE |
| BLOCK 1-4 | 4 | X1-4 | Y1-4 | W1-4 | H1-4 | NONE |
| BLOCK 1-5 | 1 | X1-5 | Y1-5 | W1-5 | H1-5 | AVAILABLE |
| BLOCK 1-6 | 1 | X1-6 | Y1-6 | W1-6 | H1-6 | AVAILABLE |
| BLOCK 1-7 | 4 | X1-7 | Y1-7 | W1-7 | H1-7 | NONE |
| BLOCK 1-8 | 1 | X1-8 | Y1-8 | W1-8 | H1-8 | AVAILABLE |
| BLOCK 1-9 | 4 | X1-9 | Y1-9 | W1-9 | H1-9 | NONE |
| BLOCK 1-10 | 1 | X1-10 | Y1-10 | W1-10 | H1-10 | AVAILABLE |
| BLOCK 1-11 | 1 | X1-11 | Y1-11 | W1-11 | H1-11 | AVAILABLE |
| BLOCK 1-12 | 1 | X1-12 | Y1-12 | W1-12 | H1-12 | AVAILABLE |
| BLOCK 1-13 | 4 | X1-13 | Y1-13 | W1-13 | H1-13 | NONE |
| BLOCK 1-14 | 1 | X1-14 | Y1-14 | W1-14 | H1-14 | AVAILABLE |
| BLOCK 1-15 | 2 | X1-15 | Y1-15 | W1-15 | H1-15 | NONE |
| BLOCK 1-16 | 1 | X1-16 | Y1-16 | W1-16 | H1-16 | AVAILABLE |

FIG. 7B

INPUT FILE INFORMATION

| Page | 1 |
|---|---|
| Number of blocks(N) | 16 |

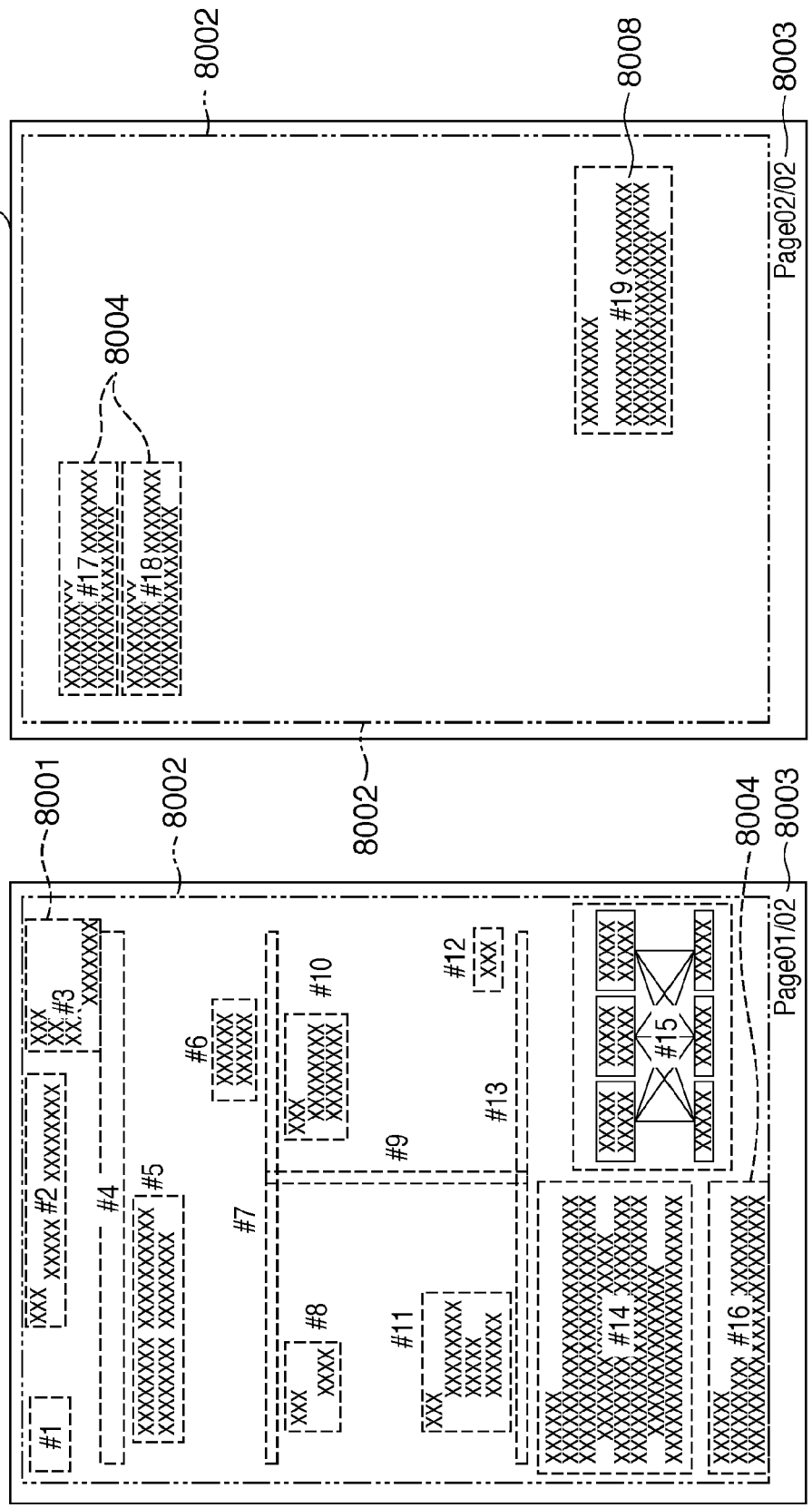

FIG. 9

META INFORMATION

| ELEMENT ID | TYPE | COORDI-NATE X | WIDTH W | FONT TYPE | COLOR TYPE | Y-COORDINATE RELATIVE POSITION | SAVING DATE | SAVING DESTINATION |
|---|---|---|---|---|---|---|---|---|
| 1 | TEXT | X1 | W1 | 1 | Bk | R1 | 2006/10/30 | http://text-db.test.co.jp/cgi-bin/test cgi?db=txt.db |
| 2 | TEXT | X2 | W2 | 1 | Bk | DISTANCE FROM Y1 | 2006/10/30 | http://text-db.test.co.jp/cgi-bin/test cgi?db=txt.db |
| 3 | TEXT | X3 | W3 | 1 | Bk | DISTANCE FROM Y2 | 2006/10/30 | http://text-db.test.co.jp/cgi-bin/test cgi?db=txt.db |
| 4 | PNG | X4 | W4 | | Bk | DISTANCE FROM Y3 | 2006/10/30 | http://text-db.test.co.jp/cgi-bin/test cgi?db=txt.db |
| | | | | | | | | |
| 16 | TEXT | X16 | W16 | 1 | Bk | DISTANCE FROM Y15 | 2006/10/30 | http://text-db.test.co.jp/cgi-bin/test cgi?db=txt.db |

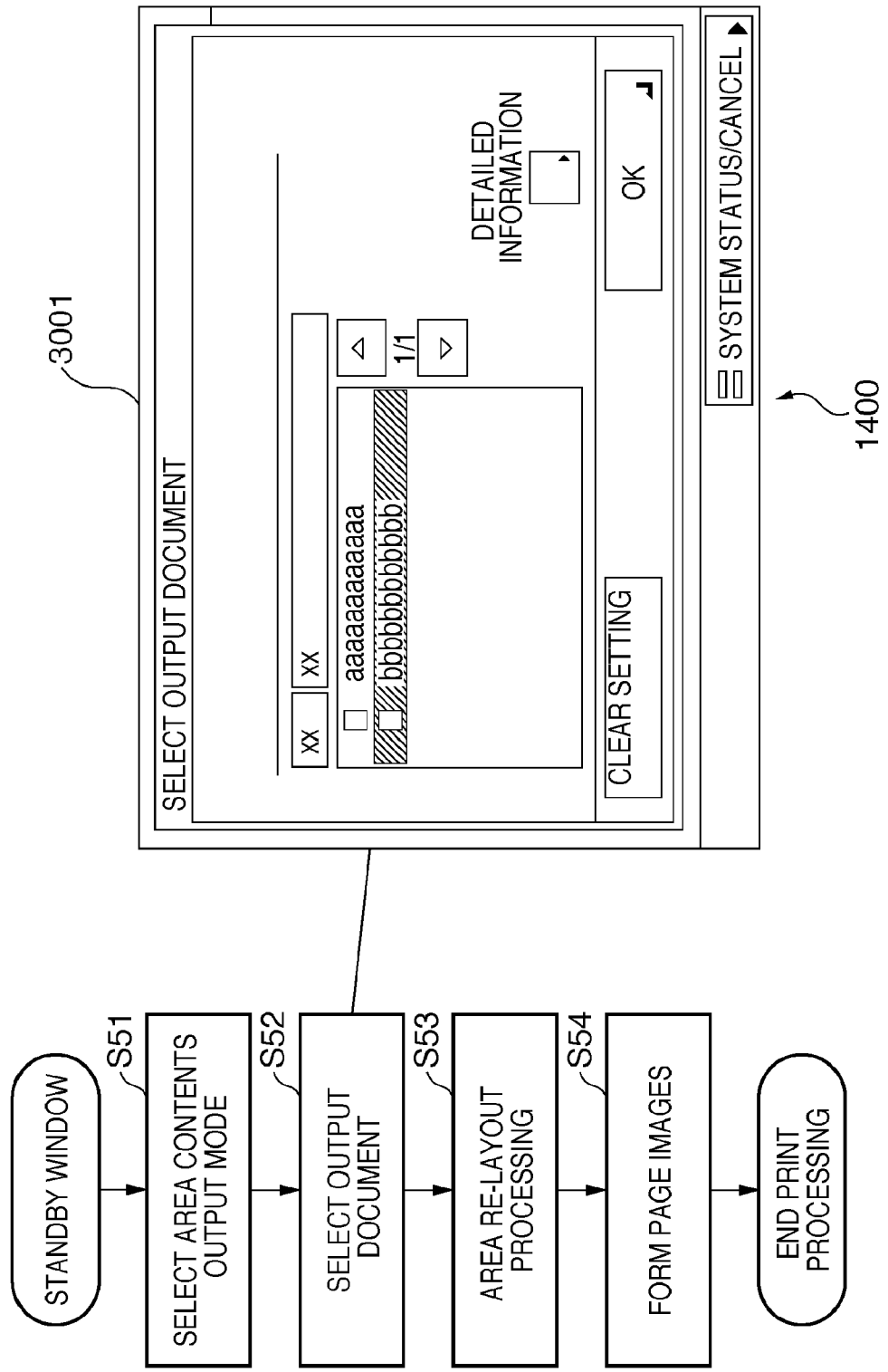

F I G. 15A

| ELEMENT ID | TYPE | X-COORDINATE START POSITION | X-COORDINATE END POSITION | Y-COORDINATE RELATIVE POSITION | COMMIT DATE | COMMIT DESTINATION |
|---|---|---|---|---|---|---|
| 1 | TEXT | 3.9 | 4.3 | 0 | 2006/10/30 | http://text-db.test.co.jp/cgi-bin/test cgi?db=txt.db |
| 2 | TEXT | 4.5 | 7.2 | 0 | 2006/10/30 | http://text-db.test.co.jp/cgi-bin/test cgi?db=txt.db |
| 3 | TEXT | 7.5 | 8.9 | 0 | 2006/10/30 | http://text-db.test.co.jp/cgi-bin/test cgi?db=txt.db |
| 4 | PNG | 3.9 | 8.9 | 1 | 2006/10/30 | http://text-db.test.co.jp/cgi-bin/test cgi?db=txt.db |
| 16 | TEXT | 3.9 | 5.0 | -0.1 | 2006/11/04 | http://text-db.test.co.jp/cgi-bin/test cgi?db=txt.db |
| 17 | TEXT | 5.0 | 8.9 | 6.5 | 2006/10/30 | http://text-db.test.co.jp/cgi-bin/test cgi?db=txt.db |

FIG. 15C
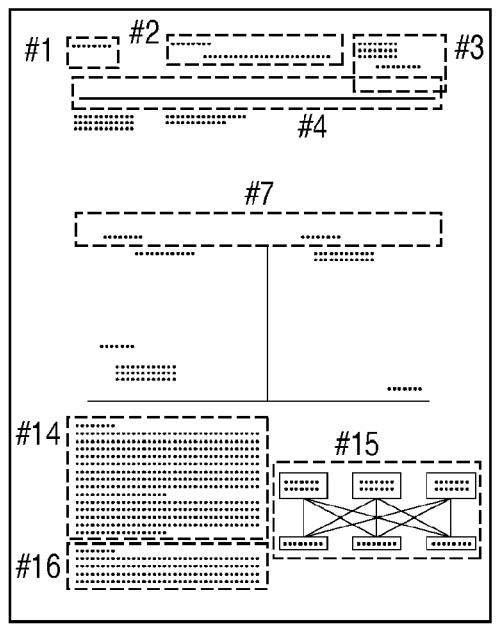
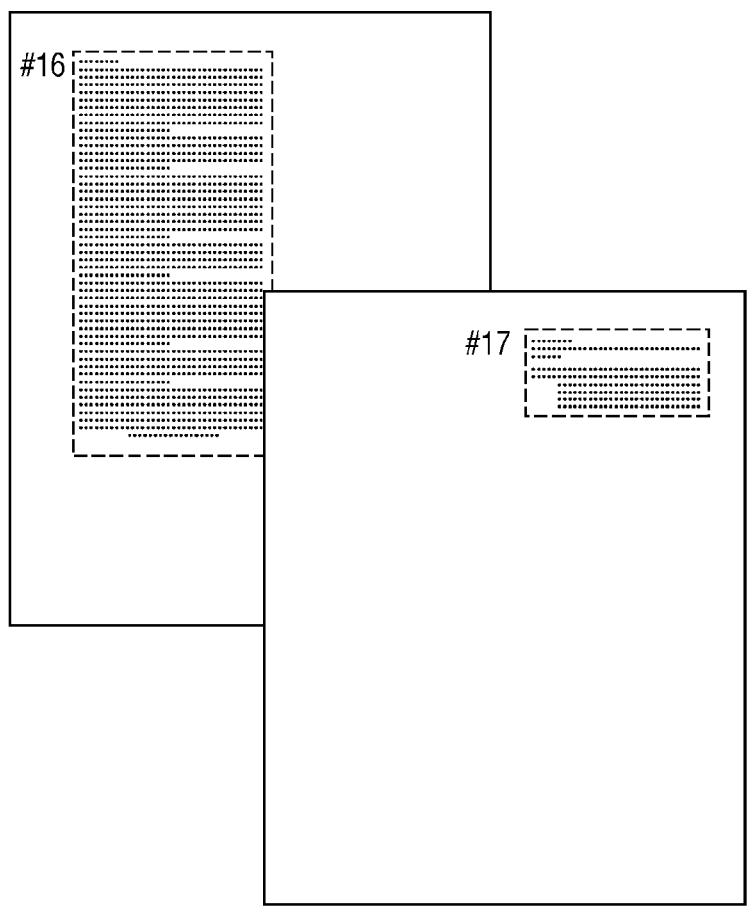

IMAGE PROCESSING APPARATUS AND CONTROL METHOD THEREOF

BACKGROUND OF THE INVENTION

1. Field of the Invention

The present invention relates to an image processing apparatus for dividing an image into a plurality of areas, and combining two or more areas which satisfy a combining condition, and a control method thereof.

2. Description of the Related Art

Japanese Patent Laid-Open No. 10-247237 describes a document image processing apparatus which scans an image of an original, divides the scanned image into a plurality of elements, and manages data for respective elements. Japanese Patent Laid-Open No. 10-247237 discloses a technique for extracting an article across pages from a document including a plurality of pages. Also, Japanese Patent Laid-Open No. 11-15826 describes a document analysis apparatus, which receives a document divided into blocks, and combines the blocks to reconstruct them to one block.

However, these related arts suffer a problem that elements other than text cannot be combined. That is, since blocks of graphics, photos, and the like cannot be combined, these graphics and photos are managed as other image contents. For this reason, upon re-editing and printing image data, a plurality of contents need to be edited. Japanese Patent Laid-Open No. 10-247237 discloses that text areas are combined until a title or separator is detected in the text area. For this reason, it is difficult to combine text areas designated with layouts such as a multicolumn layout and the like. After text areas are re-edited and their sizes are increased or decreased, when a document including these text areas is printed, layouts originally set in that document are collapsed, thus posing another problem.

SUMMARY OF THE INVENTION

The present invention enables to provide an image processing apparatus which can solve the conventional problems, and a control method thereof. Also, the present invention enables providing an image processing apparatus, which divides each page image of image data of a plurality of pages into a plurality of areas according to the types of partial images included in that image, sets a combining condition including a direction to retrieve areas to be combined from these plurality of areas, and combines two or more areas according to the combining condition, and a control method thereof. Furthermore, the present invention enables to provide an image processing apparatus which can render an image including the combined areas into page images, and can output the rendered page images, and a control method thereof.

One aspect of the present invention provides an image processing apparatus comprising: a dividing unit configured to divide each page image of image data including a plurality of pages into a plurality of areas according to types of partial areas included in that image; a holding unit configured to hold attribute information associated with at least one of coordinates, sizes, and the types of the plurality of areas; an area combining unit configured to specify at least two areas which satisfy a combining condition from the plurality of areas based on the attribute information, and to combine the specified at least two areas into one area; a setting unit configured to set at least a direction to retrieve areas to be combined as the combining condition; and a storage unit configured to store information associated with areas of the image data including the area combined by the area combining unit.

Another aspect of the present invention provides A method of controlling an image processing apparatus for dividing an image into a plurality of areas, comprising: dividing each page image of image data including a plurality of pages into a plurality of areas according to types of partial areas included in that image; holding attribute information associated with at least one of coordinates, sizes, and the types of the plurality of areas; specifying at least two areas which satisfy a combining condition from the plurality of areas based on the attribute information, and combining the specified at least two areas into one area; setting at least a direction to retrieve areas to be combined as the combining condition; and storing information associated with areas of the image data including the area combined in combining the specified at least two areas.

Further features of the present invention will become apparent from the following description of exemplary embodiments with reference to the attached drawings.

BRIEF DESCRIPTION OF THE DRAWINGS

FIGS. 6A and 6B are views for explaining a practical example of block selection processing according to the embodiment;

FIG. 7A shows a table which stores the types and coordinates of the respective areas shown in FIG. 6B and OCR information indicating OCR processing applied to text areas;

FIG. 7B shows page information of the table shown in FIG. 7A;

FIGS. 8A and 8B are views for explaining area combining processing by the MFP according to the embodiment;

FIG. 9 shows a practical example of meta information obtained as a result of the area combining processing shown in FIGS. 8A and 8B;

FIG. 14 is a flowchart for explaining an overview of processing upon printing area contents by the MFP according to the embodiment; and FIGS. 15A to 15C are views for explaining an overview of processing for obtaining print image data when area contents are edited using a database, and their sizes are changed in the MFP according to the embodiment.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
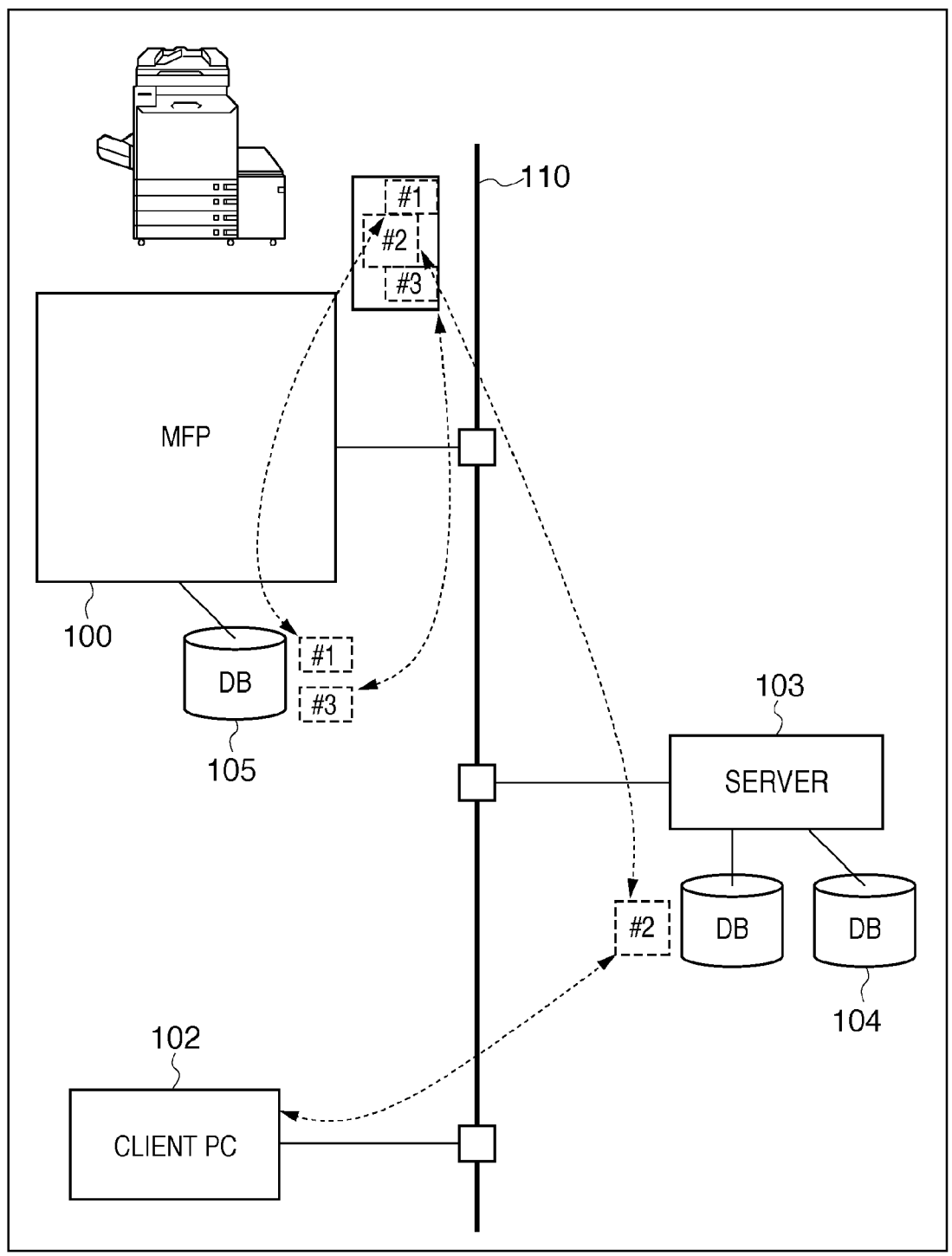
FIG. 1 is a block diagram showing an example of the arrangement of an image processing system according to an embodiment of the present invention.

FIG. 1 is a block diagram showing an example of the arrangement of an image processing system according to an embodiment of the present invention.

An image processing apparatus according to this embodiment is a multi-function peripheral (to be abbreviated as an MFP hereinafter) 100, which operates in an environment connected to a LAN 110. To the LAN 110, a client PC 102 which issues a print instruction to the MFP 100 is connected. To the MFP 100, a database 105 used to manage contents is connected. Furthermore, to the LAN 110, a server 103 is also connected. A database 104 connected to this server 103 can output contents onto the LAN 110, and can store contents via the LAN 110. The client PC 102 requests the server 103 to acquire contents, displays and modifies the acquired contents, and can save the modified contents in the database 104 again.

Figure 2:
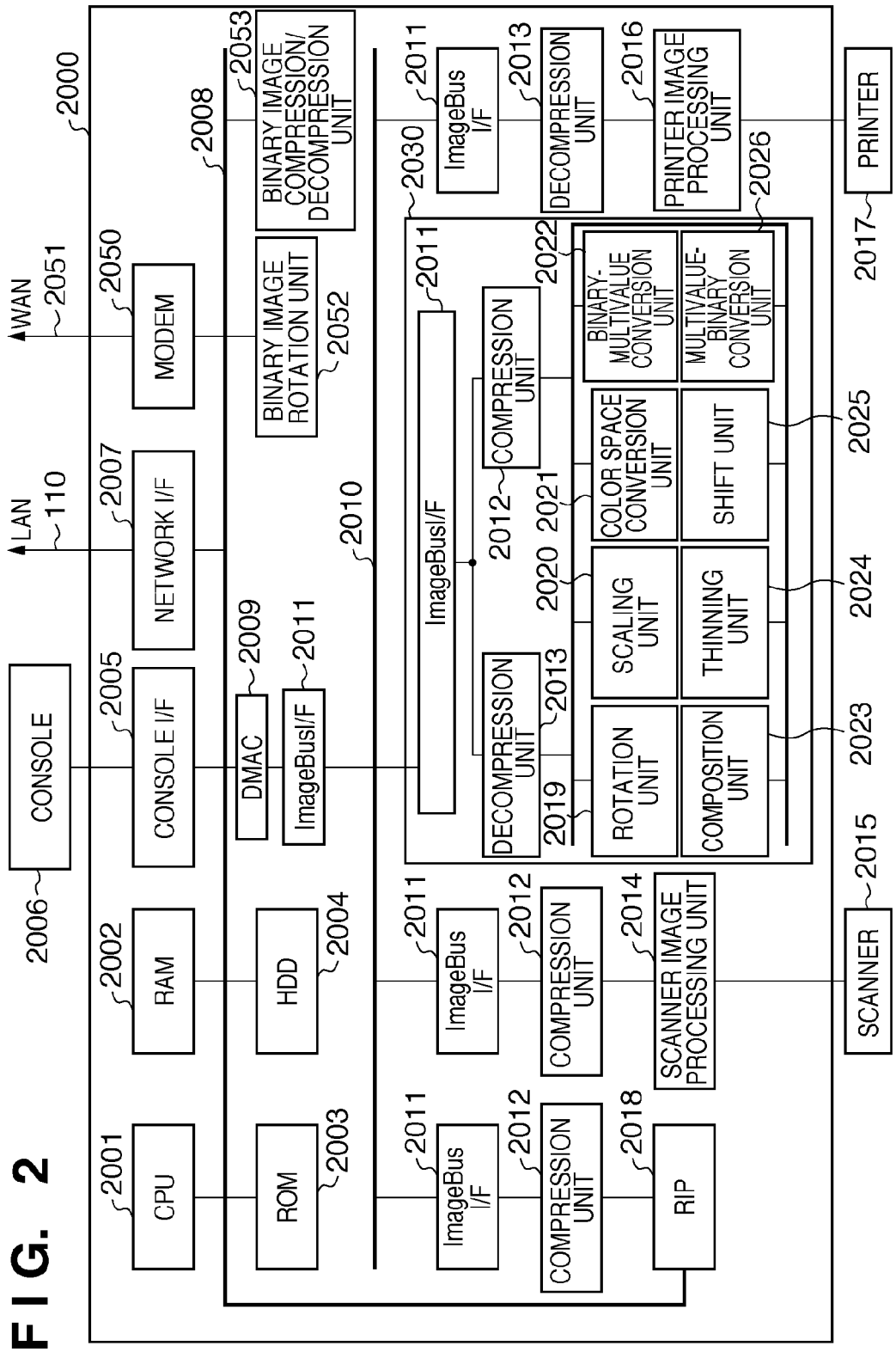
FIG. 2 is a block diagram for explaining the arrangement of an MFP according to the embodiment.

FIG. 2 is a block diagram for explaining the arrangement of the MFP 100 according to this embodiment.

A controller 2000 inputs and outputs image information, device information, and the like, and controls the operation of this MFP 100 as a whole. This controller 2000 is connected to a color scanner 2015 as an image input device, and a color printer 2017 as an image output device, and is connected to the LAN 110 and a public line (WAN) 2051. A CPU 2001 controls this controller 2000. A RAM 2002 is a system work memory used to store programs and data required to operate the CPU 2001, and is also an image memory used to temporarily store image data. A ROM 2003 is a boot ROM, which stores a boot program of the system. An HDD 2004 is a hard disk drive, in which an OS and various programs are installed. These programs are loaded onto the RAM 2002 upon power ON, and are executed under the control of the CPU 2001.

A console I/F 2005 is an interface unit for a console (UI) 2006, and plays roles of outputting image data to be displayed on the console 2006 to the console 2006, and transferring information input at the console 2006 by the user to the CPU 2001. A network I/F 2007 is connected to the LAN 110 to exchange data with the LAN 110. A modem 2050 is connected to the public network 2051 to exchange image information. A binary image rotation unit 2052 and binary image compression/decompression unit 2053 convert the direction of an image and convert the image to a predetermined resolution or a resolution according to the ability of a partner before a binary image is sent via the modem 2050. Note that this binary image compression/decompression unit 2053 supports encoding/decoding of JBIG, MMR, MR, MH, and the like. A DMAC 2009 is a DMA controller, which transfers image data stored in the RAM 2002 to an image bus I/F 2011 by DMA. Also, the DMAC 2009 writes image data received from the image data bus I/F 2011 in the RAM 2002 by DMA. The aforementioned devices are connected to a system bus 2008.

Each image bus I/F 2011 can exchange image data at high speed via an image bus 2010. Each compression unit 2012 compresses image data by JPEG for respective 32 pixels×32 pixels before the image data is output onto the image bus 2010. Each decompression unit 2013 decompresses encoded image data sent via the image bus I/F 2011.

A raster image processor (RIP) 2018 receives a PDL code from the PC 102 via the LAN 110, and outputs the PDL code onto the system bus 2008. In this way, the CPU 2001 stores that PDL code in the RAM 2002. The CPU 2001 converts that PDL code into an intermediate code, and supplies the intermediate code to the RIP 2018 via the system bus 2008 again to control the RIP 2018 to render the intermediate code into a bitmap image (multi-valued). A scanner image processing unit 2014 applies various kinds of appropriate image processing (e.g., correction, modification, and editing) to a color image or monochrome image input from the scanner 2015, and outputs image data (multi-valued) as a result of the processing to the compression unit 2012. Likewise, a printer image processing unit 2016 applies various kinds of appropriate image processing (e.g., correction, modification, and editing) for the printer 2017, and outputs the processed image to the printer 2017. Upon printing, since the decompression unit 2013 converts binary data into multi-valued data, both binary and multi-valued data can be output.

An image conversion unit 2030 has various image conversion functions used to convert image data stored in the RAM 2002 and to write it back to the RAM 2002 again. A rotation unit 2019 can rotate each image data of b 32 pixels×32 pixels through a designated angle, and supports input and output of binary and multi-valued data. A scaling unit 2020 has a function of converting the resolution of image data (e.g., from 600 dpi to 200 dpi) and scaling the image data (e.g., from 25% up to 400%). Before scaling, the scaling unit 2020 sorts image data of 32 pixels×32 pixels into image data for 32 lines. A color space conversion unit 2021 converts input multi-valued image data from YUV image data into Lab image data using matrix calculations and an LUT. The color space conversion unit 2021 has 3×8 matrix calculations and a linear LUT, and can attain known undercolor removal and bleed-through prevention. The image data converted in this manner is output as multi-valued data. A binary-multivalue conversion unit 2022 converts binary image data into multi-valued, 8-bit (256 tones) image data. Conversely, a multivalue-binary conversion unit 2026 converts, for example, 8-bit (256 tones) image data into binary data by error diffusion or the like. A composition unit 2023 has a function of compositing two multi-valued image data in the RAM 2002 into one multi-valued image data. For example, the composition unit 2023 composites a corporate logo image and original image to add the corporate logo to the original image. A thinning unit 2024 executes resolution conversion by thinning pixels of multi-valued image data. The thinning unit 2024 can output ½, ¼, and ⅛ multi-valued image data. Using the thinning unit 2024 and scaling unit 2020 in combination, image data can be enlarged or reduced over a broader range. A shift unit 2025 appends or removes a blank space part to or from binary or multi-valued image data, and outputs the processed data. The rotation unit 2019, scaling unit 2020, color space conversion unit 2021, binary-multivalue conversion unit 2022, composition unit 2023, thinning unit 2024, shift unit 2025, and multivalued-binary conversion unit 2026 can operate in conjunction with each other. For example, upon applying rotation and resolution conversion to multi-valued image data on the RAM 2002, these processes can be executed by coupling the rotation unit 2019 and scaling unit 2020 without the intervention of the RAM 2002. Note that a program code of an algorithm according to this embodiment is stored in a part of system software on the HDD 2004.

Figure 3:
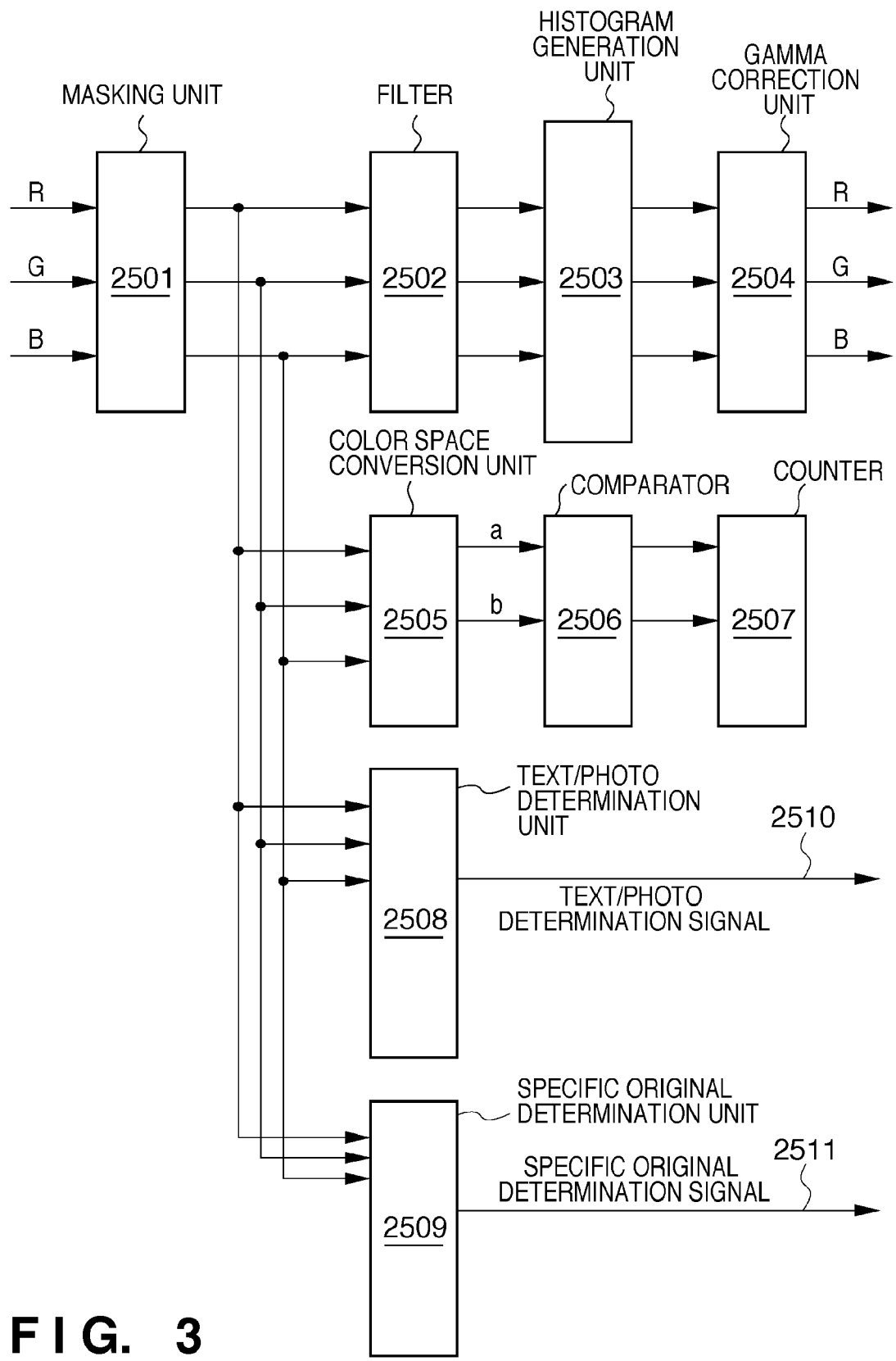
FIG. 3 is a block diagram for explaining the arrangement of a scanner image processing unit according to the embodiment.

FIG. 3 is a block diagram for explaining the arrangement of the scanner image processing unit 2014 according to this embodiment.

A masking unit 2501 converts R, G, and B 8-bit luminance signals input from the scanner 2015 into standard R, G, and B color signals which do not depend on CCD filter colors. A filter 2502 executes processing for blurring or sharpening an image using, for example, a 9×9 matrix. A histogram generation unit 2503 is a processing unit which samples input image signals, and its output is used to determine a background level of an input image. This histogram generation unit 2503 generates histograms by sampling R, G, and B data in a rectangular area bounded by start and end points, which are designated at a predetermined pitch in the main and sub scanning directions, in the main and sub scanning directions. Note that the main scanning direction indicates a raster direction of an image upon raster rendering, and the sub scan direction indicates a direction perpendicular to that main scanning direction. The generated histograms are read out when the undercolor removal or bleed-through prevention function is designated. The background level of an original is estimated based on the histograms, is saved in the RAM 2002 or HDD 2004 as an undercolor removal level together with image data, and is used in image processing upon printing or sending that image data. A gamma correction unit 2504 executes processing for increasing or decreasing the density of the overall image. For example, the gamma correction unit 2504 converts a color space of an input image into an arbitrary color space or executes correction processing associated with the color appearance of an input system.

A color space conversion unit 2505 converts image signals before scaling into L, a, and b signals so as to determine if an original is a color or monochrome original. Of these signals, a and b represent color signal components. A comparator 2506 receives these color signal components. If the color signal components are equal to or higher than a predetermined level, the comparator 2506 determines a chromatic color; otherwise, it determines an achromatic color, thus outputting a 1-bit determination signal. A counter 2507 counts the number of 1-bit determination signals output from this comparator 2506. A text/photo determination unit 2508 extracts character edges from image data to determine a text area and photo area, and outputs a text/photo determination signal 2510. This determination signal 2510 is also stored in the RAM 2002 or HDD 2004 together with image data, and is used upon printing. A specific original determination unit 2509 compares input image signals with a specific pattern stored in itself, and outputs a determination signal 2511 indicating whether or not an input image matches a specific original. Image data can be modified according to this determination signal 2511 to prevent banknotes, securities, and the like from being forged.

Figure 4:
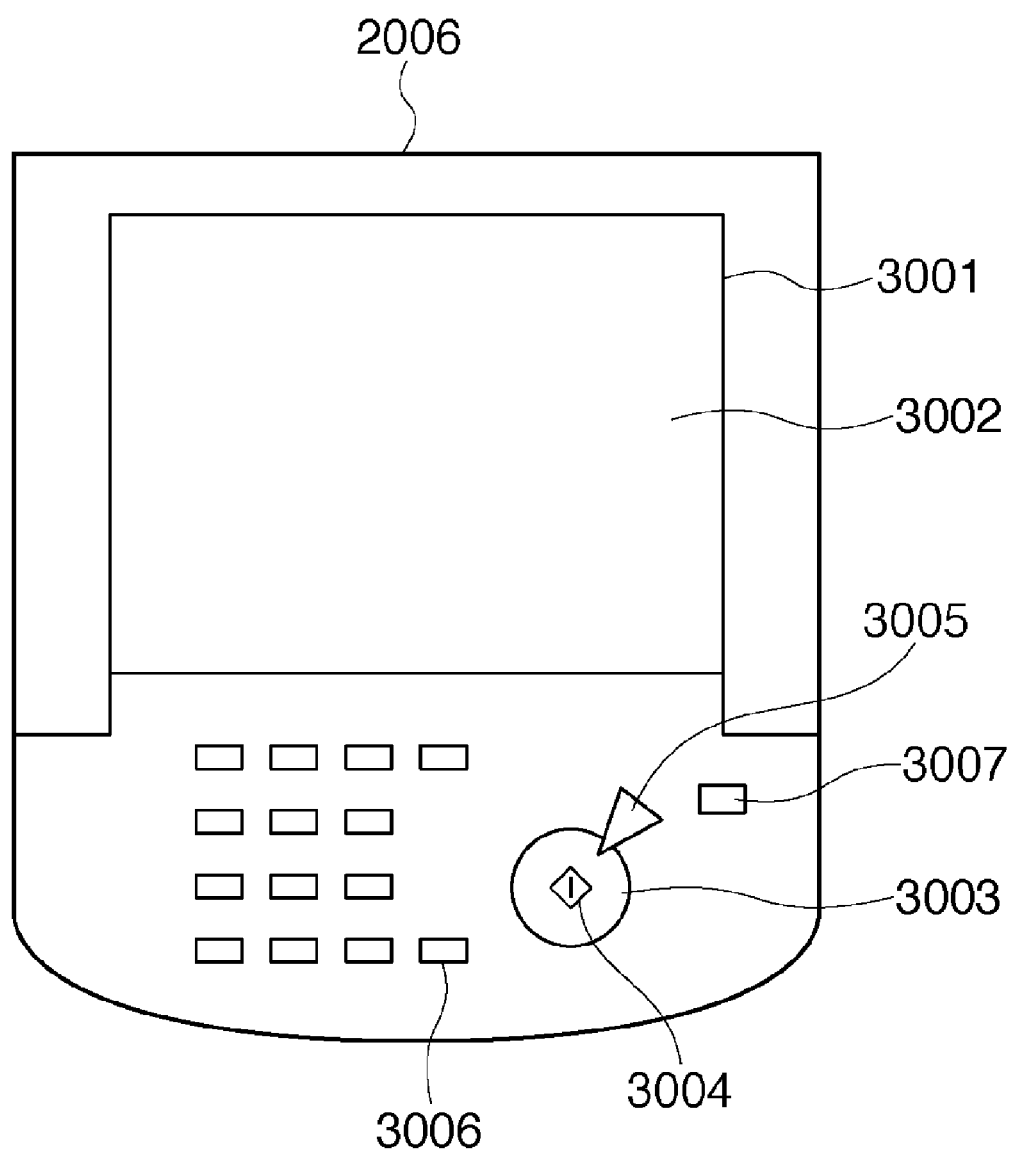
FIG. 4 is an external view showing the arrangement of a console of the MFP according to the embodiment.

FIG. 4 is an external view showing the arrangement of the console 2006 of the MFP 100 according to this embodiment.

A display unit 3001 has a touch panel sheet 3002 adhered on its display screen. An operation window of the system and software keys are displayed on the screen of the display unit 3001, and when the user presses one of the displayed keys, the position information of that key is sent to the CPU 2001. A start key 3003 is used to give the instruction to start an original scanning operation, FAX send operation, and the like. At the center of this start key 3003, a two-color LED 3004 including green and red LEDs is arranged, and indicates by its emitting color whether or not the start key 3003 is ready to use. A stop key 3005 serves to stop the active operation. An ID key 3006 is used when the user inputs a user ID. A reset key 3007 is used to reset settings on the console 2006.

[Processing Overview]

An overview of the overall processing for dividing an image into areas, and acquiring contents of text, ruled lines, figure, photo, and the like included in respective areas (area contents) in the MFP 100 according to the embodiment of the present invention will be described below with reference to FIGS. 5A to 5D.

Figure 5A:
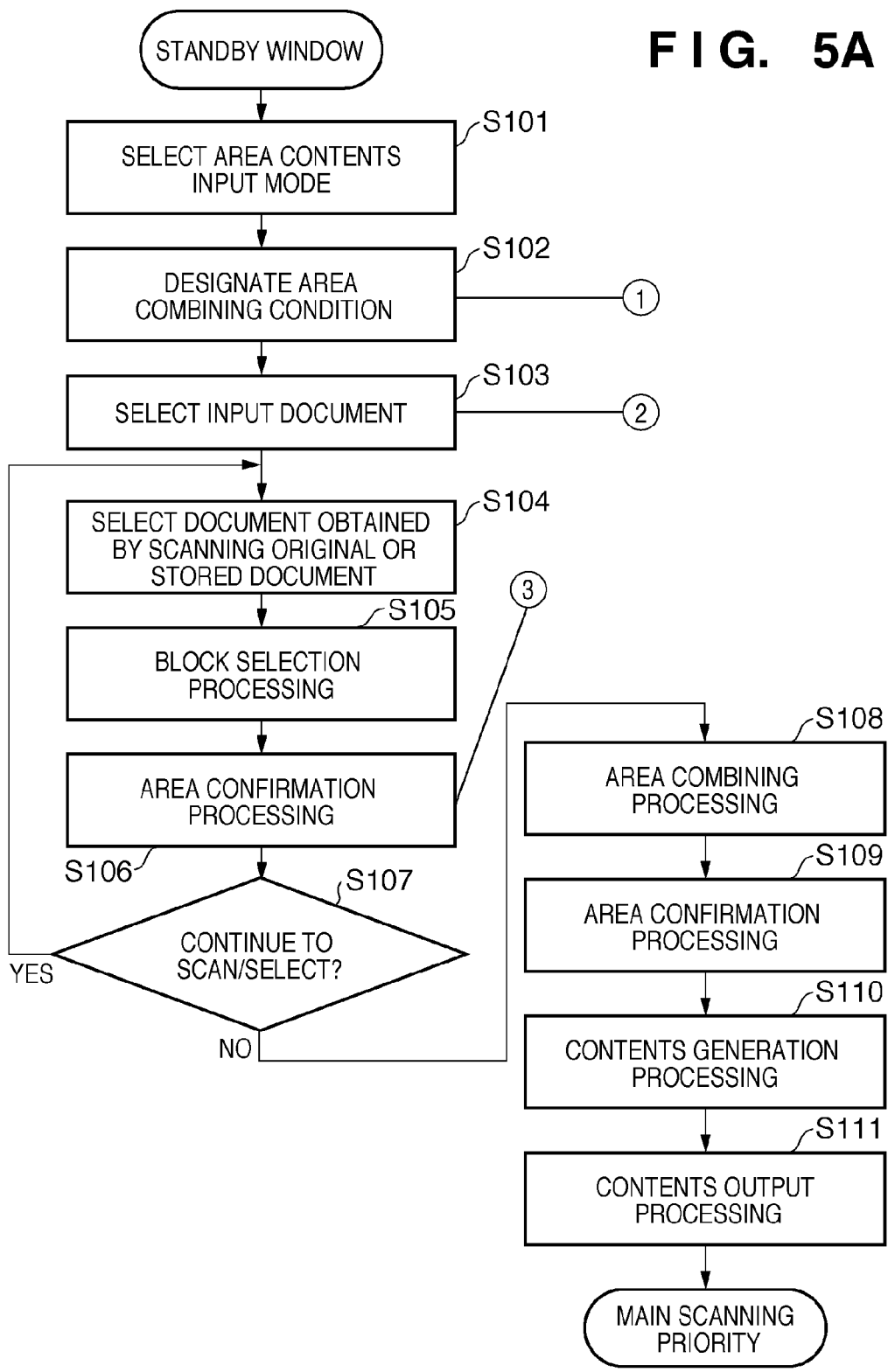
FIG. 5A is a flowchart for explaining processing for dividing each page image of image data representing a document into a plurality of areas, and generating and outputting contents by combining these areas in the MFP according to the embodiment.
Figure 5B:
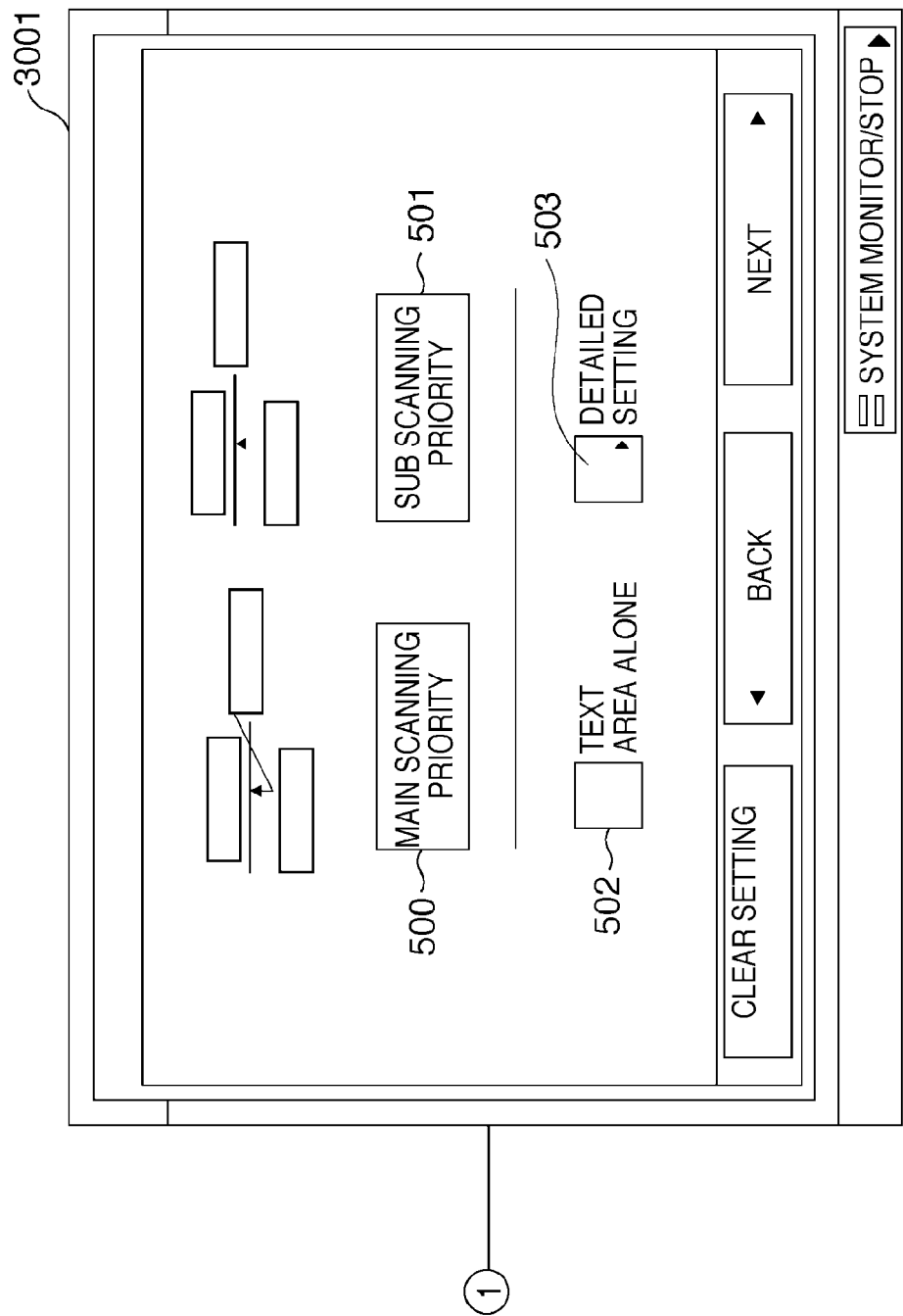
FIGS. 5B to 5D are views for explaining UI windows displayed by the process shown in FIG. 5A.
Figure 5C:
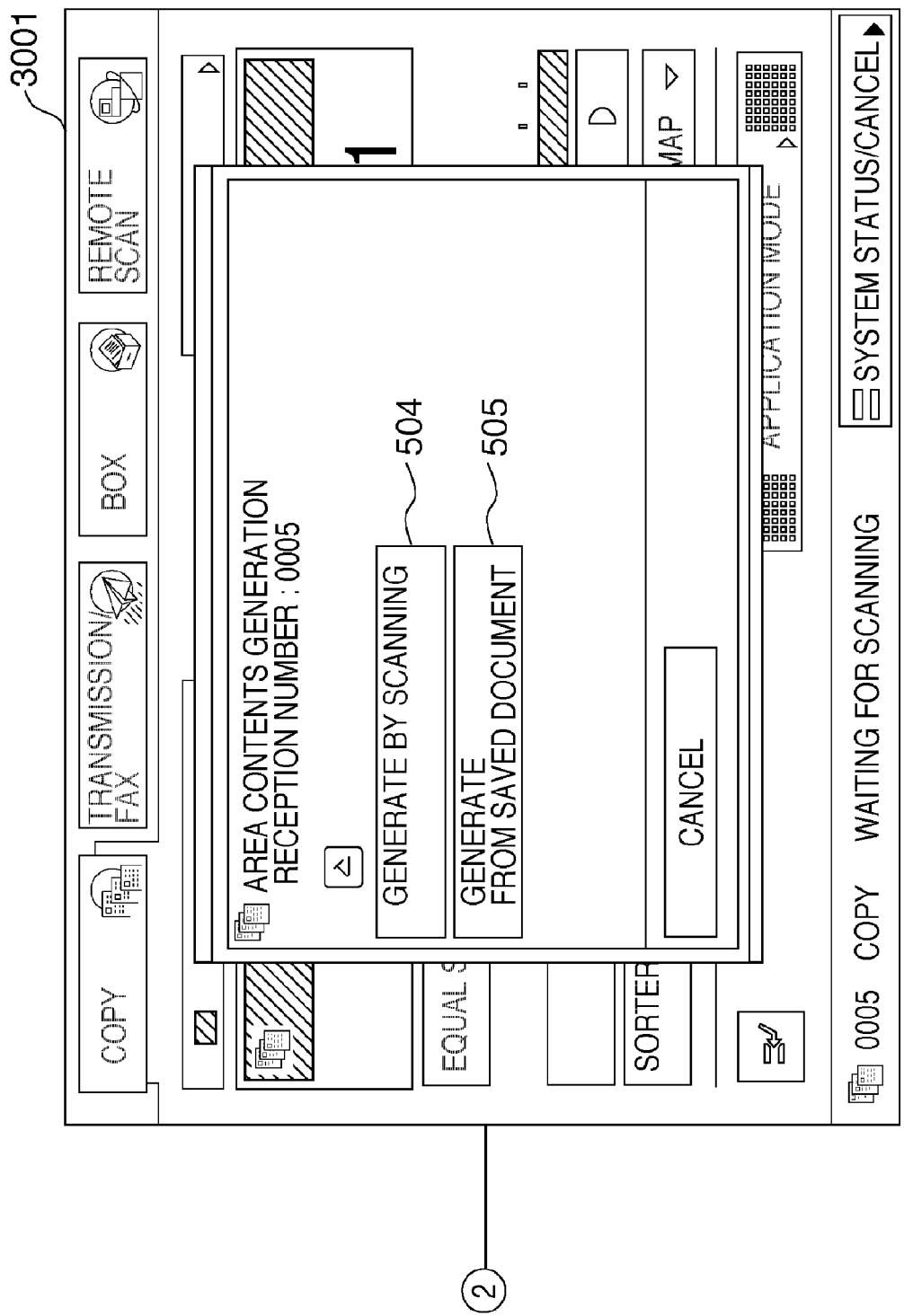
Figure 5D:
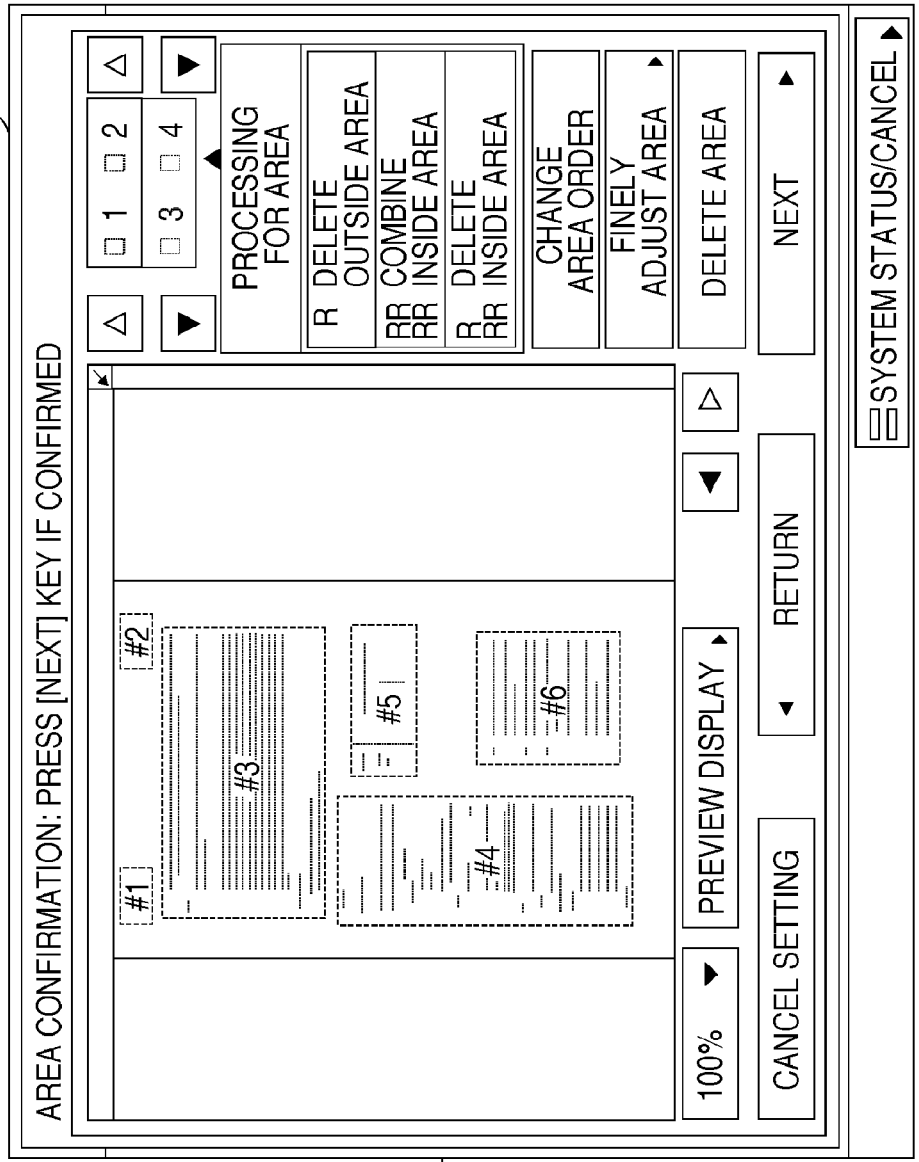

FIG. 5A is a flowchart for explaining the processing for dividing each page image of image data which represent a document into a plurality of areas according to the types of partial images included in that image, and generating and outputting contents by combining these areas in the MFP 100 according to this embodiment. FIGS. 5B to 5D are views for explaining UI windows displayed by the process shown in FIG. 5A

In step S101, an operator inputs an operation instruction of the image processing method according to this embodiment (an input mode of contents corresponding to respective areas) on the standby window via the console 2006. The process advances to step S102, and the operator selects a combining condition of areas of respective input pages. In this case, the operator selects one of the main and sub scanning directions to preferentially retrieve areas to be combined of contents recognized as identical types.

In FIG. 5B, On the UI window displayed on the display unit 3001, reference numeral 500 denotes a button used to give the instruction to prioritize the main scanning direction as the first direction (main scanning priority); and 501, a button used to give the instruction to prioritize the sub scanning direction as the second direction orthogonal to the first direction (sub scanning priority). Reference numeral 502 denotes a button used to give the instruction to select text areas alone as the type to be combined. Or this button 502 can be used to select to combine image and graphic areas of other types. When the operator operates a detailed setting button 503, he or she can set an area (trimming) which is to undergo area determination, a degree of roughly or finely selecting areas, a combining determination condition of areas, and the like. The combining determination condition includes: whether or not to combine areas regardless of monochrome/color; whether or not to combine areas regardless of font types; a maximum distance (millimeters) in the main scanning or sub scanning direction between areas to be selected as those to be combined; a maximum main scanning width difference (millimeters) between two areas to be selected as those to be combined; and the like. After the operator selects and instructs the combining condition in this way, the process advances to step S103.

In step S103, the operator selects a document to be input. In this case, as shown in FIG. 5C, the operator selects whether region contents are generated based on image data of a document scanned by the scanner 2015 (instructed by a "generated by scanning" button 504) or by selecting image data of a document saved in the RAM 2002 or the like (instructed by a "generate from saved document" button 505). The process then advances to step S104.

In step S104, if the operator operates the "generate by scanning" button 504, the scanner 2015 scans one original to obtain an image signal (8 bits/pixel) at a resolution of 600 dpi. The scanner image processing unit 2014 applies pre-processing to this image signal, and saves image data for one page in the HDD 2004 via the image conversion unit 2030. When the scanner 2015 is a scanner with a feeder having an automatic page turning function, image data for a bundle of originals may be scanned and stored. On the other hand, if the operator operates the "generate from saved document" button 505, the CPU 2001 displays a list of saved documents on the display unit 3001, and prompts the operator to select a desired document from the list. After the image data of the document to be processed are stored or selected, the process advances to step S105.

In step S105, the CPU 2001 separates areas of the stored image data into a text/line image part and halftone image part. The CPU 2001 further separates the text part into segments for blocks grouped as partial images for paragraphs or for partial images as a table and figure defined by lines. On the other hand, the CPU 2001 applies so-called block selection processing for dividing the image part expressed by halftone into independent blocks for respective blocks such as image parts, background parts, and the like of blocks separated into rectangles. This block selection processing will be described later.

The process advances to step S106, and the CPU 2001 displays, as shown in FIG. 5D, a preview to make the operator confirm if the stored image data of each page is correctly recognized as areas that he or she intended. In this step, the operator can change the layout order of areas, delete areas, combine areas, finely adjust each area size, and so forth.

The process advances to step S107 to inquire the operator as to whether or not to start processing for combining and outputting areas. If the operator wants to further add an original to be input, the process returns to step S104; otherwise, the process advances to area combining processing in step S108. This combining processing will be described later. After the area combining processing is executed in step S108, the process advances to step S109 to display the combined areas on the display unit 3001 so as to make the operator confirm them again. The operator re-adjusts the areas if required. After the areas are settled, the process advances to step S110, and the CPU 2001 executes contents generation processing according to the types of areas. In FIG. 5D, reference numeral 506 denotes an example of a region division confirmation window displayed on the display unit 3001 in step S106 or S109.

In step S110, if the content of the area of interest is a graphic or table, the CPU 2001 converts that content into lossless-encoded image data such as PNG data, GIF data, or the like. If the content of that area is a photo, the CPU 2001 converts that content into lossy-encoded image data such as JPEG data, JPEG2000 data, or the like. If the type of the content of that area is text, the CPU 2001 couples text contents of the combined part, and converts them into character code data of SJIS or UTF8. The CPU 2001 displays meta information (attribute information) such as a position (coordinates) on image data, size, font type, color attribute, type, and the like of each area on the display unit 3001. The process advances to step S111 to store the obtained contents in the database 105, and holds its storage destination as meta information. In this way, for example, when the operator selects a document and gives the instruction to print that document, the CPU 2001 can read out corresponding contents based on that meta information, and can re-form them as a raster image.

[Description of Block Selection Processing]

This block selection processing is processing for dividing an image of one page into a plurality of areas according to the types of partial images included in that image.

FIGS. 6A and 6B are views for explaining a practical example of this block selection (image area separation) processing. FIG. 6A shows an image of an original image scanned by the scanner 2015 or read out from the memory in step S104. FIG. 6B shows a state in which that original image is divided into a plurality of partial images (areas) by the block selection processing in step S105. In FIG. 6B, blocks #1 to #3, #5, #6, #8, #10, #11, #14, and #16 are text areas, blocks #4, #7, and #13 are line areas, and block #15 is a figure area.

A practical example of this block selection processing will be described below.

Image data of that original is binarized to black and white data, which undergoes contour tracing to extract pixel clusters bounded by black pixel contours. For each black pixel cluster with a large area, white pixels included in that cluster undergo contour tracing to extract white pixel clusters, and black pixel clusters are recursively extracted from white pixel clusters having a predetermined area or more.

The black pixel clusters obtained in this way are categorized based on their sizes and shapes, and are categorized into areas having different types. For example, black pixel clusters, which have an aspect ratio close to "1", and the sizes falling within a predetermined range, are classified as pixel clusters corresponding to characters, and a part where neighboring characters, which line up well and can be grouped, is classified to a text area. A flat pixel cluster is classified to a line area. Moreover, a range occupied by black pixel clusters which have a predetermined size or more and include rectangular white pixel clusters that line up well is classified to a table area. An area where indefinite pixel clusters are scattered is classified as a photo area, and other pixel clusters having an arbitrary shape are classified to a graphic area.

[Character Recognition Processing]

FIGS. 7A and 7B show a table (FIG. 7A) which stores the types and coordinates of respective areas shown in FIG. 6B and OCR information indicating that OCR processing is applied to text areas, and page information (FIG. 7B) of that table. Note that each block number 1-$n$ ($n$=1 to 16) in FIG. 7A indicates block #n of the first page. A type "1" indicates a text area; "2", a figure; "3", a table; and "4", a photo. Coordinates (X, Y) indicate those of the upper left corner of a rectangle indicating each block. The shape of that block can be specified by a width W and height H. Also, as can be seen from FIG. 7B, the image of the first page includes 16 blocks.

Upon execution of the OCR processing, images extracted for respective characters undergo character recognition using a certain pattern matching method to obtain corresponding character codes. This character recognition processing is processing for comparing an observation feature vector obtained by converting features obtained from each character image into a (several ten)-dimensional numerical value string with dictionary feature vectors calculated in advance for respective letter types, and determining a letter type with the closest distance as a recognition result. Various known methods are available as an extraction method of a feature vector. For example, in one method, a character is divided into meshes, and a (mesh count)-dimensional vector obtained by counting character lines in meshes for respective directions as line elements is used as a feature.

Upon applying character recognition to each character area extracted by this block selection processing, horizontal or vertical writing is determined for that area, and lines are extracted in the corresponding direction. After that, characters are extracted from each line to obtain character images. As for determination of horizontal or vertical writing, horizontal or vertical projections with respect to pixel values in that area are calculated. When the variance of the horizontal projections is large, that area is determined as a horizontal writing area; when the variance of the vertical projections is large, that area is determined as a vertical writing area. As for decomposition into character strings and characters, lines are extracted using the horizontal projections in case of horizontal writing, and characters are extracted using the vertical projections with respect to each extracted line. For a vertical writing text area, the horizontal and vertical directions in the above description can be reversed. Note that a character size can be detected at that time.

[Font Recognition]

A plurality of sets of dictionary feature vectors as many as the number of letter types are prepared in correspondence with shape types of characters, that is, font types. Upon collation, a font type is output together with a character code, thereby identifying the font of that character.

[Color Determination of Character]

When an original is color, a color of each character is extracted from a color image, and is stored in meta information (to be described later).

With the above processing, character codes which belong to each text area, and feature information including the shapes, sizes, and colors of characters can be held. As a result, even when a layout of characters is changed, original characters can be reproduced nearly faithfully. In this manner, block information serving as a candidate of area contents is generated and registered for each page. The "candidate of area contents" means that contents of that area may vary as a result of combining of areas to be described later.

[Overview of Area Contents Combining Processing]

The area combining processing for combining areas using area contents candidates obtained by the block selection processing for each page will be described below.

Figure 8B:
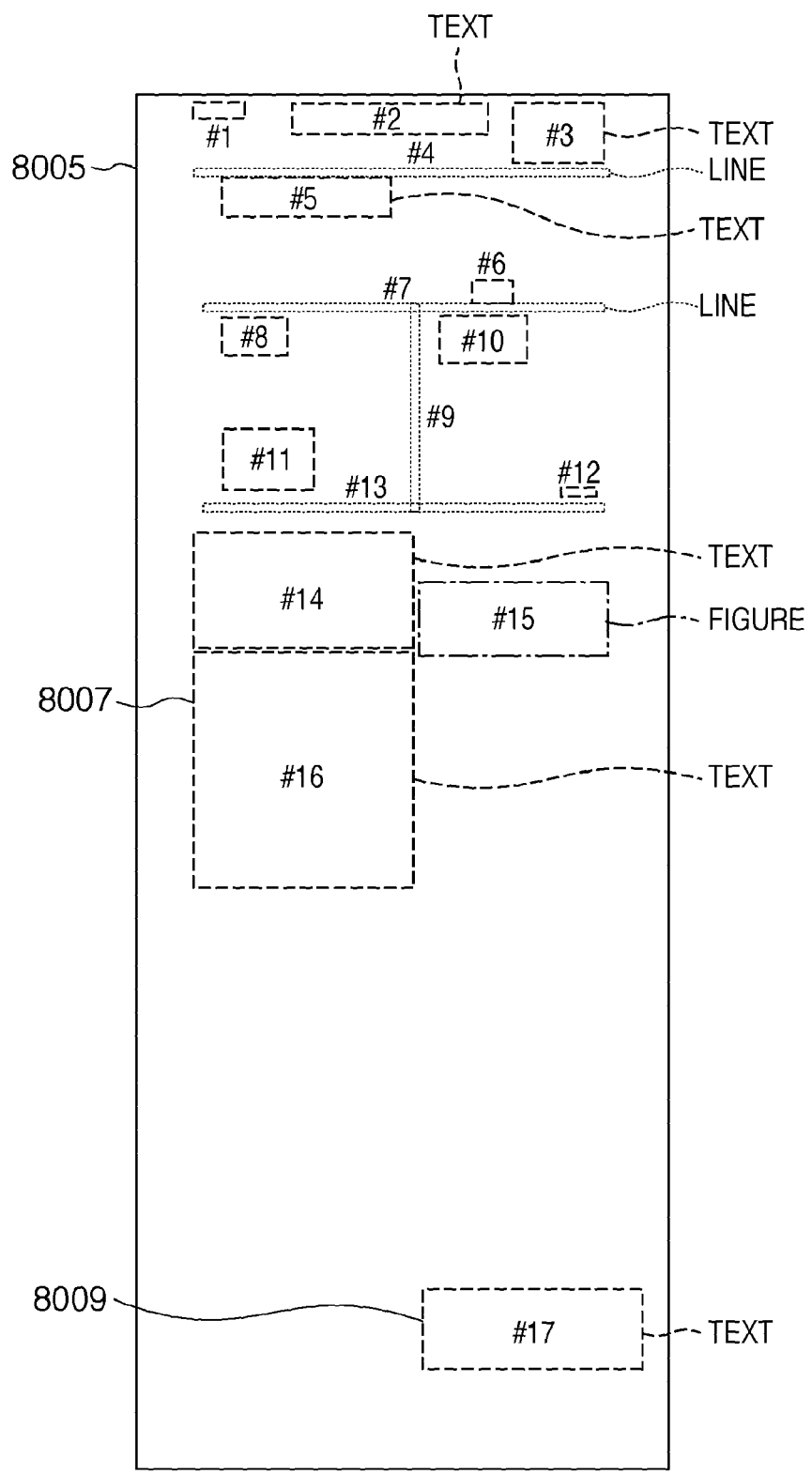

FIGS. 8A and 8B are views for explaining the area combining processing by the MFP 100 according to this embodiment.

This area combining processing is processing for combining blocks of area contents candidates for a plurality of pages shown in FIG. 8A, which are scanned or selected in step S104 above, as needed, as shown in FIG. 8B. For example, areas which satisfy the combining condition are combined, as shown in FIG. 8B, in accordance with the image types such as text, graphic, photo, line, table, and the like, the position attributes such as the start positions, widths, and the like, and the aforementioned combining condition. This processing is executed as pre-processing for registering a certain area as contents. Then, parameters such as the height, color information, font information, and the like of the combined area, and characters included in that area are updated.

A practical example of the area combining processing will be described below with reference to FIGS. 8A and 8B.

In scanned images 8001, ranges 8002 as a combining target are set. The ranges 8002 as the combining target are combined in the sub scanning direction, as indicated by a range 8005 in FIG. 8B. Therefore, information of a footer like a range 8003 in FIG. 8A is excluded from the combining processing.

It is then checked if there are areas which neighbor those corresponding to blocks #1 to #19 included in this range 8005 and have the same image type. If such areas having the same image type are found, the difference between their width information is detected. If areas which have the same image type and the same width like areas 8004 (blocks #16 to #18) in FIG. 8A are found, they are combined into one area 8007 (block number #16) in FIG. 8B. That is, this new block #16 (area 8007 in FIG. 8B) is obtained by combining blocks #16 to #18 in FIG. 8A into one. In this case, a block having a subordinate block number like block number #19 (area 8008) becomes block #17 like block 8009 in FIG. 8B since its block number is reassigned.

In this way, areas (blocks) included in all pages are verified to combine areas, and to update their numbers. The contents generation processing is applied to the area as the updated result. That is, if the type of that area indicates a text area, character recognition of that area, recognition of a character font, and color determination processing is executed again. In this way, codes of character information and character attributes in that area are obtained.

FIG. 9 shows a practical example of meta information obtained as a result of the area combining processing shown in FIGS. 8A and 8B. In FIG. 9, an element ID corresponds to the number # of each block.

Character information as the contents of each area is stored in the database 105, and its storage destination is held. Table and line image areas are converted into lossless-encoded image data such as PNG data, GIF data, or the like and are stored in the database 105, and their storage destinations are held as block information. An area determined as a photo area is converted into lossy-encoded image data such as JPEG data and stored in the database 105, and its storage destination is held as block information. Note that the character information, lossless-encoded image data, and lossy-encoded image data may be held in different databases. Furthermore, in a preferred embodiment, saving destination information of previous contents and that of the contents may be saved in associated with each other as a layout order. In this way, document data is converted into contents for each significant group (area), and is distributed and saved.

[Variations of Area Contents Combining Processing]

Variations of the area combining processing will be described below with reference to FIGS. 10A and 10B and FIGS. 11A and 11B.

Figure 10A:
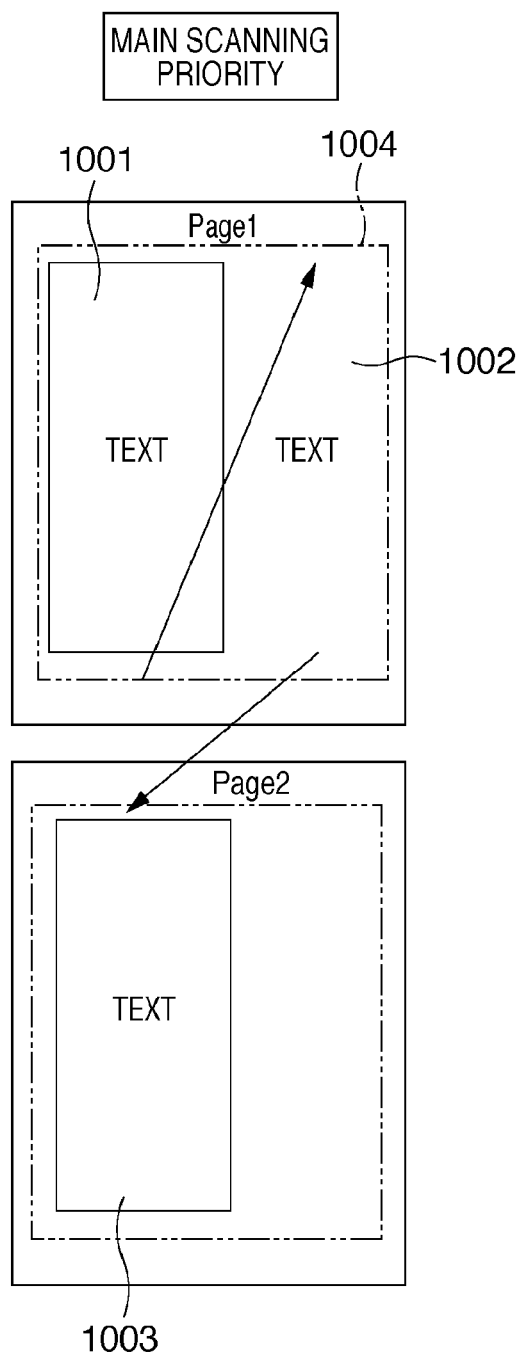
FIGS. 10A and 10B are views for explaining combining processing of text areas.
Figure 10B:
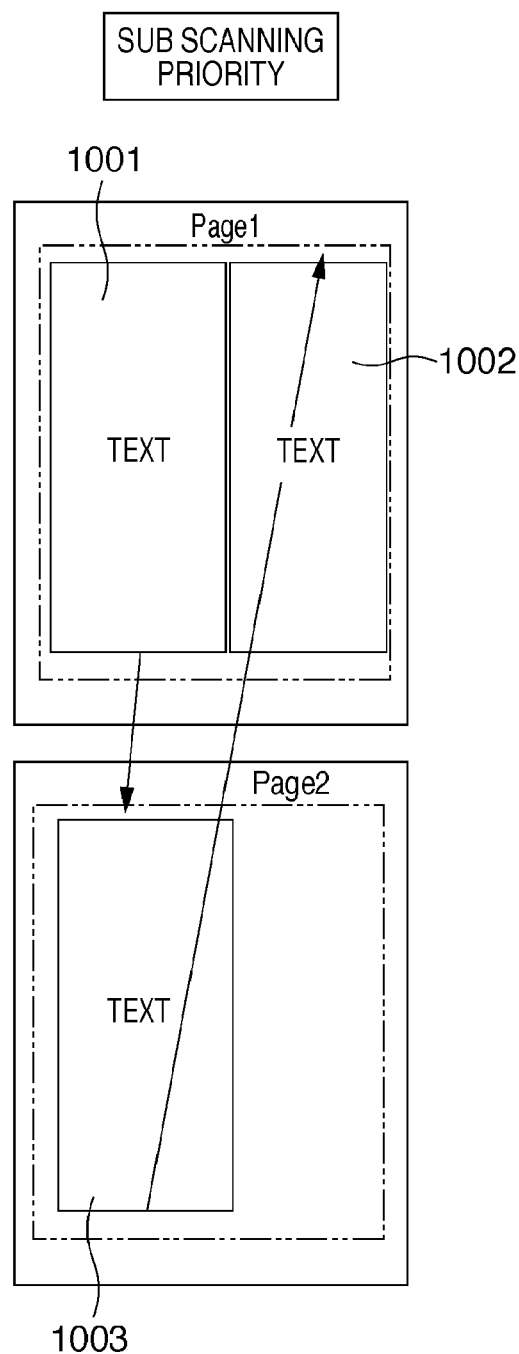

FIGS. 10A and 10B are views for explaining combining processing of text areas.

Referring to FIGS. 10A and 10B, areas 1001 to 1003 are text areas, and all these areas have the same main scanning width and height. Assume that the distance between the areas 1001 and 1002, and that between the areas 1001 and 1003 satisfy the combining condition.

A case will be explained first wherein the main scanning priority mode shown in FIG. 10A that prioritizes the main scanning direction is set.

Assume that the areas 1001 to 1003 satisfy the combining condition {image type: identical/width: identical/distance: vicinity/character font type: identical/color attribute: identical/image type to be combined: text}. Hence, the combining condition designated by the operator in step S102 above is required. Upon combining areas in the main scanning priority mode, as shown in FIG. 10A, the area 1001 and the area 1002 which neighbor the area 1001 in the main scanning direction are combined to be laid out in the main scanning direction. Next, since an area 1004 obtained by combining the areas 1001 and 1002, and the area 1003 satisfy the aforementioned combining condition, these areas are further combined to lay out the area 1003 in the main scanning direction. In this case, as the meta information shown in FIG. 9, the area information of each of the areas 1002 and 1003 is deleted, and character information as a group of codes is registered. In addition, the relative positions of subsequent areas in the main scanning direction are updated as needed.

On the other hand, in case of FIG. 10B, the sub scanning priority mode that prioritizes the sub scanning direction is set. Note that the areas 1001 to 1003 satisfy the combining conditions. Hence, when the operator sets the sub scanning priority mode in step S102 above, the area 1001 is combined with the area 1003 to be laid out in the sub scanning direction, as shown in FIG. 10B. Next, since an area obtained by combining the areas 1001 and 1003, and the area 1002 further satisfy the aforementioned combining condition, an area obtained by combining the areas 1001, 1002, and 1003 to be laid out in the sub scanning direction is determined. That is, an area is obtained by laying out and combining the areas 1001, 1003, and 1002 in the sub scanning direction in the order named.

In FIGS. 11A to 11D, areas 1101 to 1103 have the same width in the main scanning direction, and areas 1102 and 1102' have a height smaller than other areas. As for the distance between areas 1101 and 1102 or 1102', these areas are adjacent to each other in both the main and sub scanning directions. Also, as for the distance between the areas 1102 and 1103, these areas are separated from each other in the sub scanning direction.

Figure 11A:
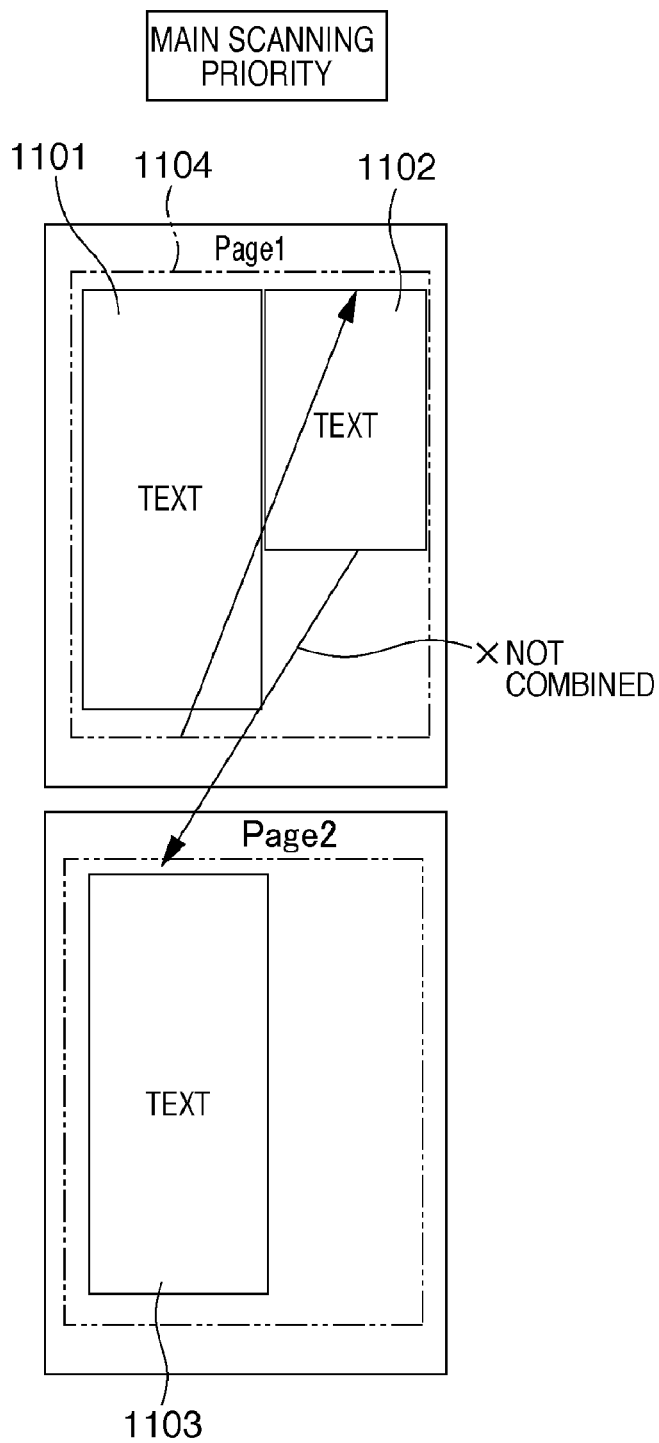
FIGS. 11A to 11D are views showing an example of combining areas in a main scanning priority mode and sub scanning priority mode according to the embodiment.

A case will be explained first wherein the main scanning priority mode shown in FIG. 11A is set.

The areas 1101 and 1102 satisfy the combining condition {image type: identical/width: identical/distance: vicinity/font type: identical/color attribute: identical/image type to be combined: text}. Upon combining areas preferentially in the main scanning direction, the area 1101 is combined to the area 1102 to be laid out in the main scanning direction. Next, an area 1104 obtained in this way is spaced apart from the area 1103 in the sub scanning direction. For this reason, these areas are not combined. Therefore, the areas 1104 and 1103 are laid out to line up in the sub scanning direction, and are determined as different contents.

Figure 11B:
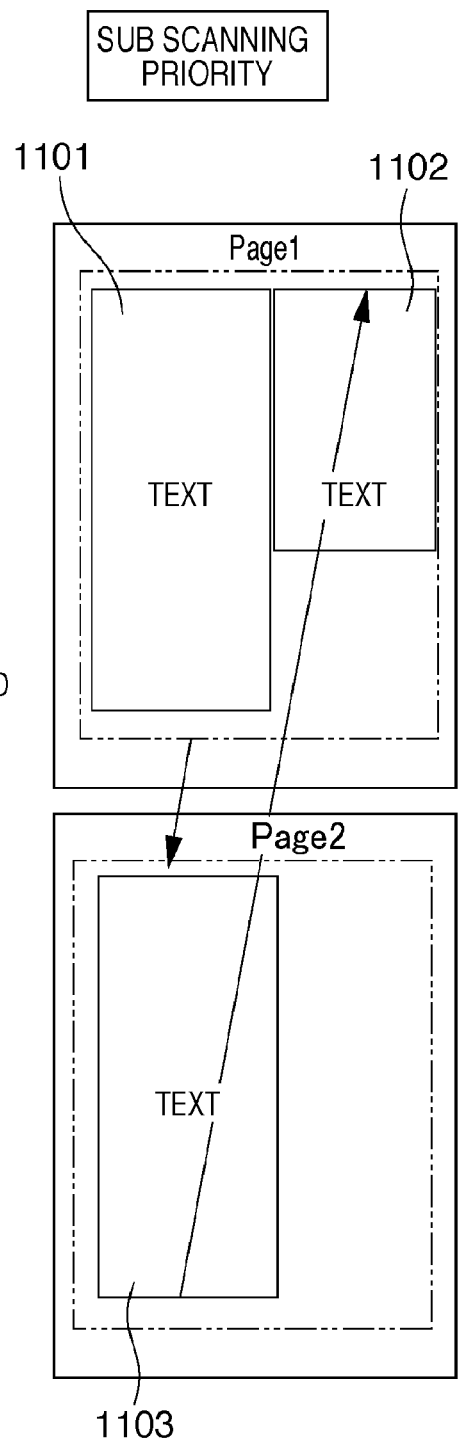

A case will be described below with reference to FIG. 11B wherein the sub scanning priority mode is set.

The areas 1101 and 1103 satisfy the combining condition {image type: identical/width: identical/distance: vicinity/font type: identical/color attribute: identical/image type to be combined: text}. Since the sub scanning direction is prioritized, the areas 1101 and 1103 are combined to be laid out in the sub scanning direction. Next, an area obtained by combining these areas 1101 and 1103 and the area 1102 are adjacent to each other, and satisfy the condition. For this reason, it is determined that these areas are to be combined. Therefore, an area obtained by laying out the areas 1101, 1103, and 1102 in the sub scanning direction is formed, and contents are determined for this area.

Figure 11C:
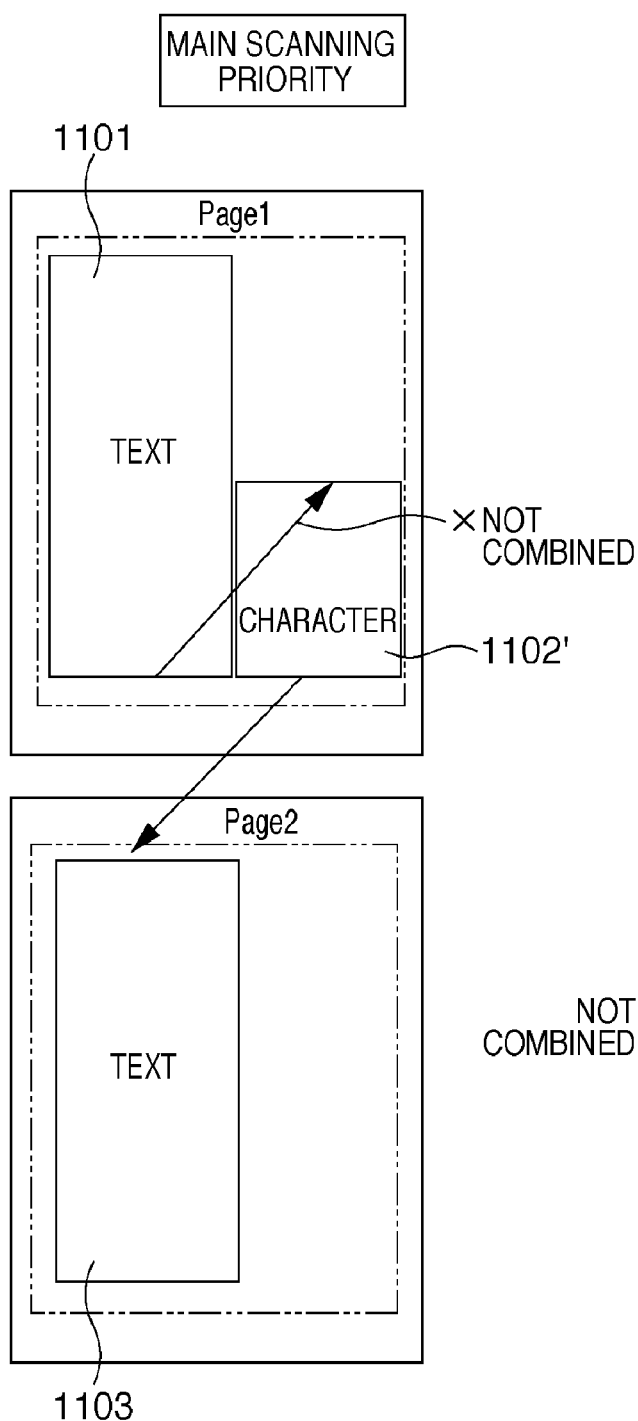
Figure 11D:
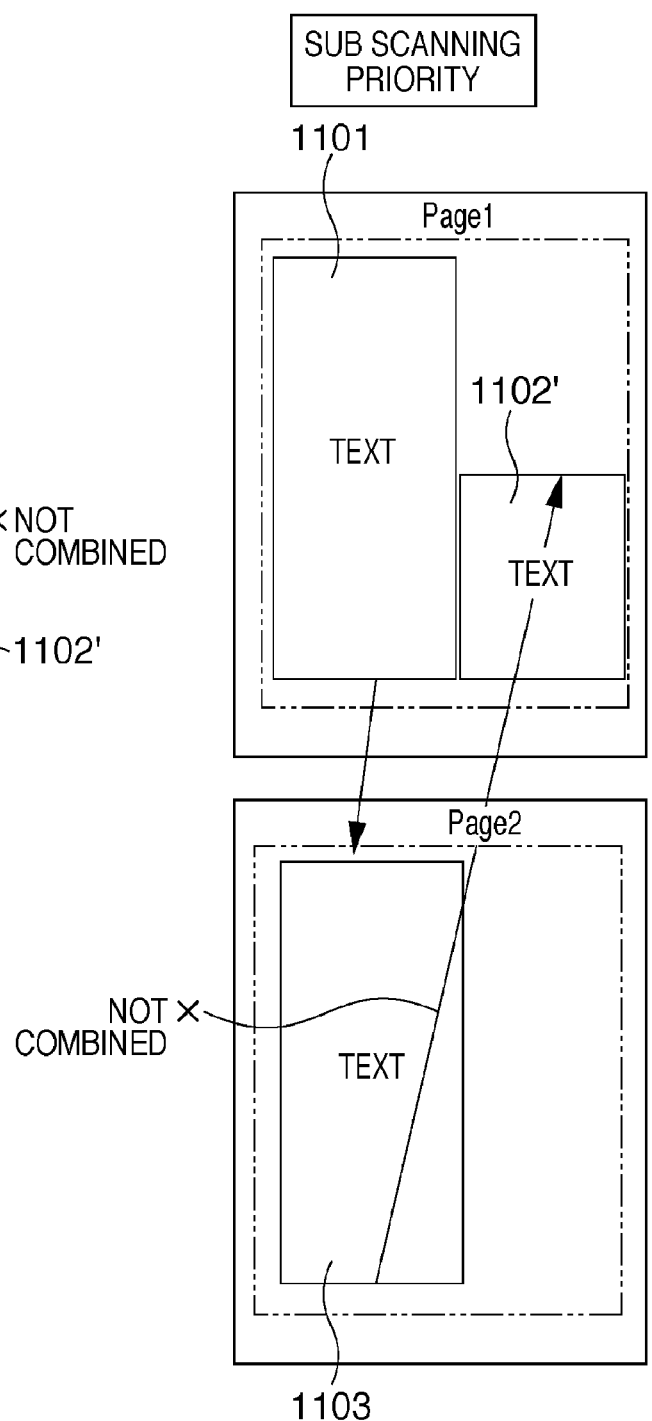
Figure 12A:
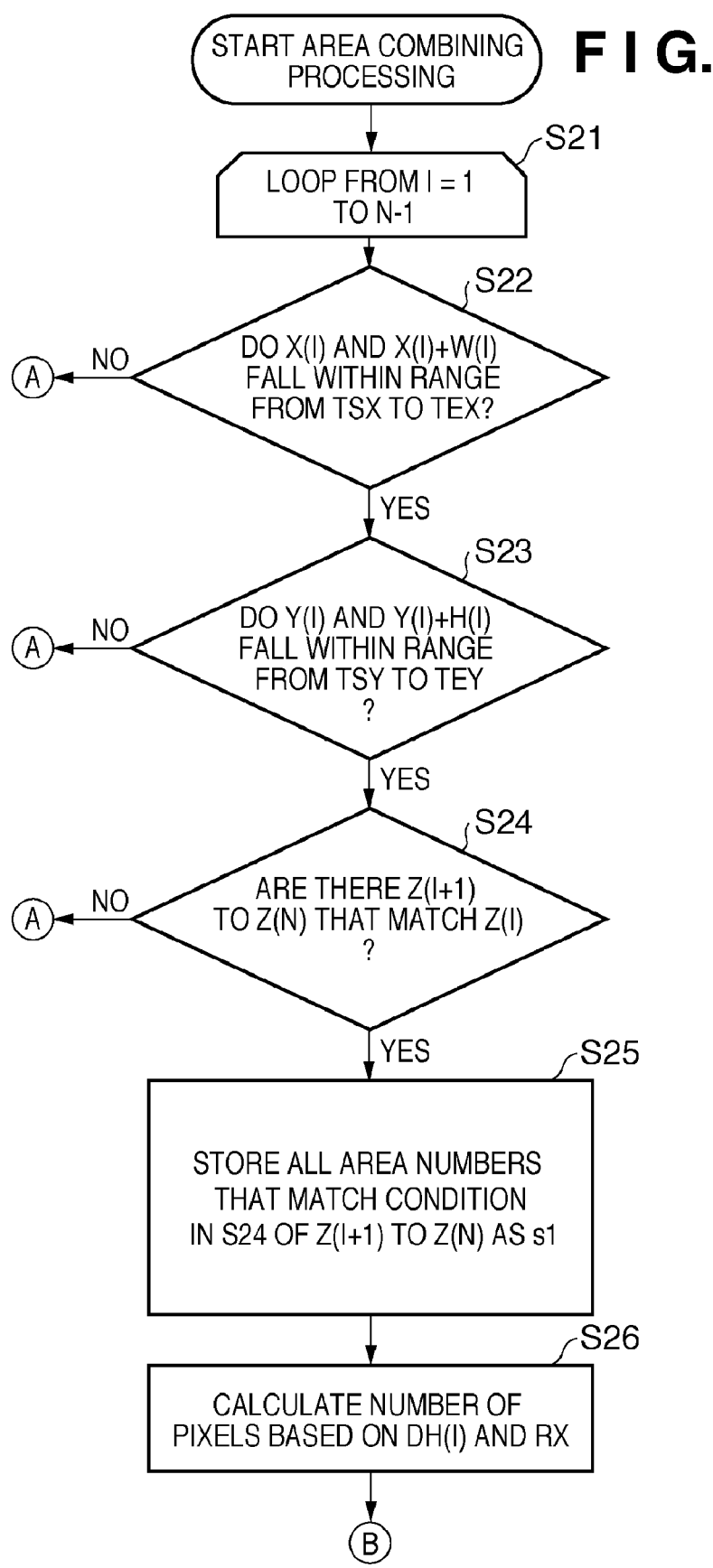
FIGS. 12A and 12B are flowcharts for explaining processing for combining areas by the MFP according to the embodiment.
Figure 12B:
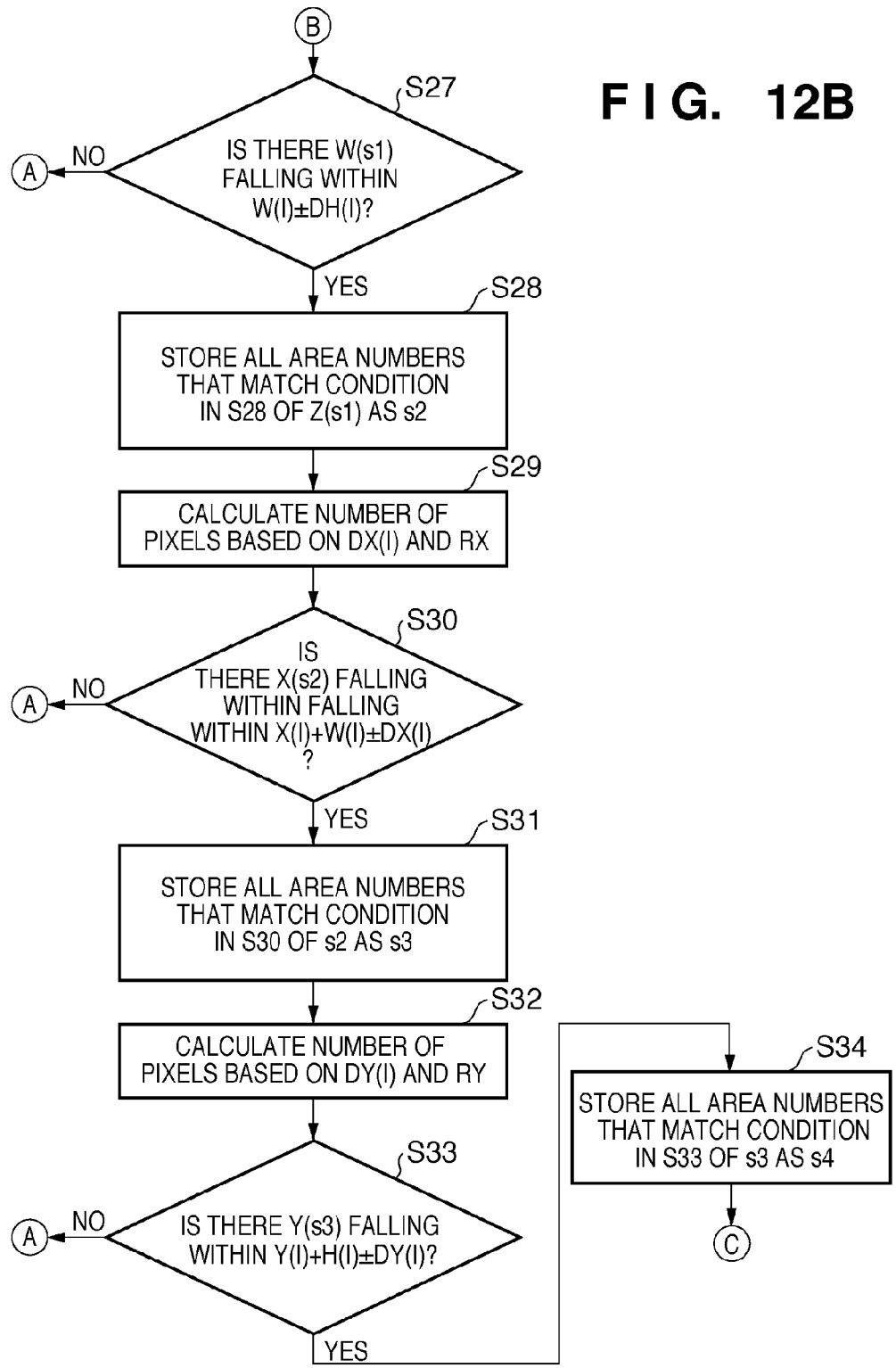
Figure 13A:
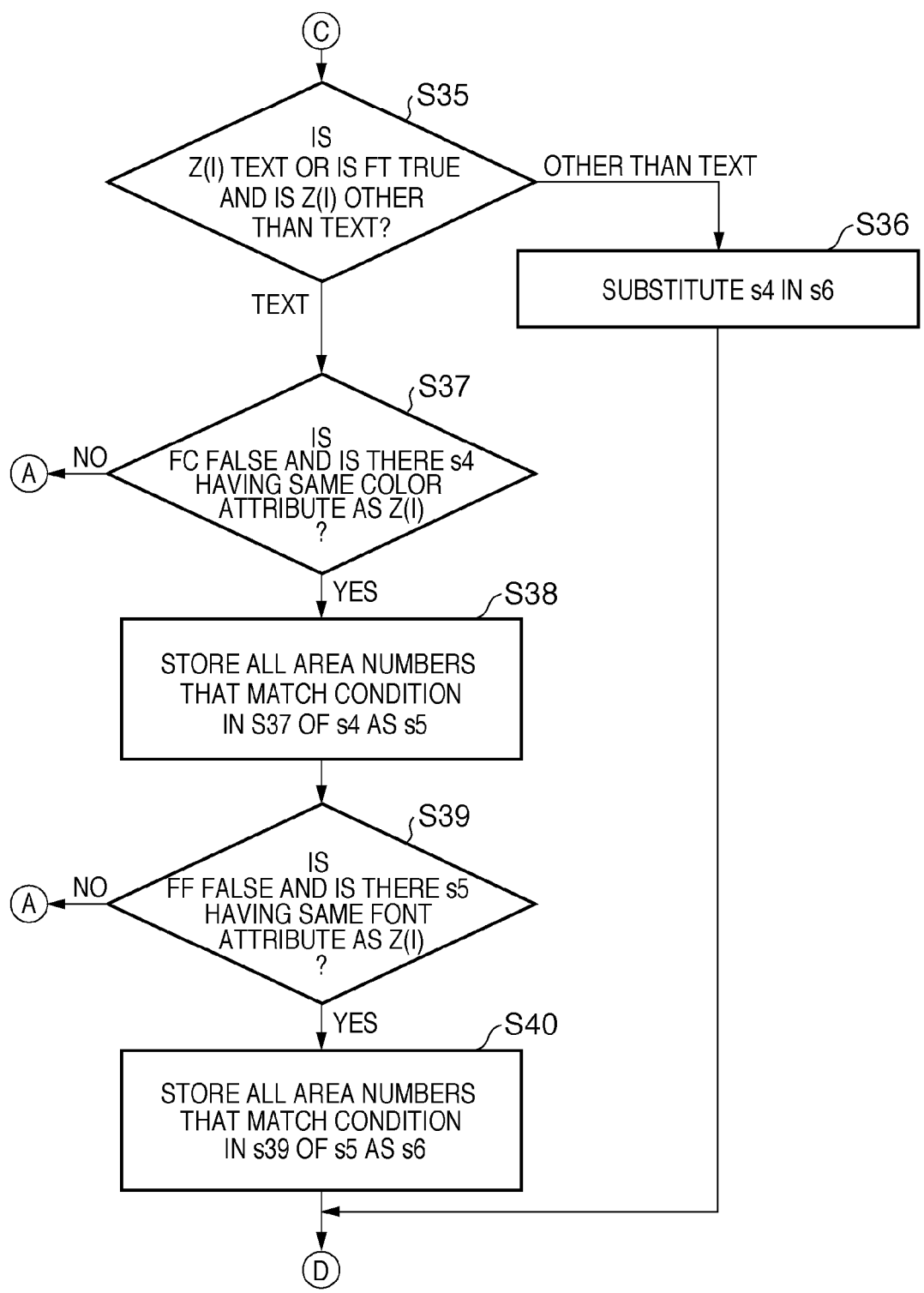
FIGS. 13A and 13B are flowcharts for explaining processing for combining areas by the MFP according to the embodiment.
Figure 13B:
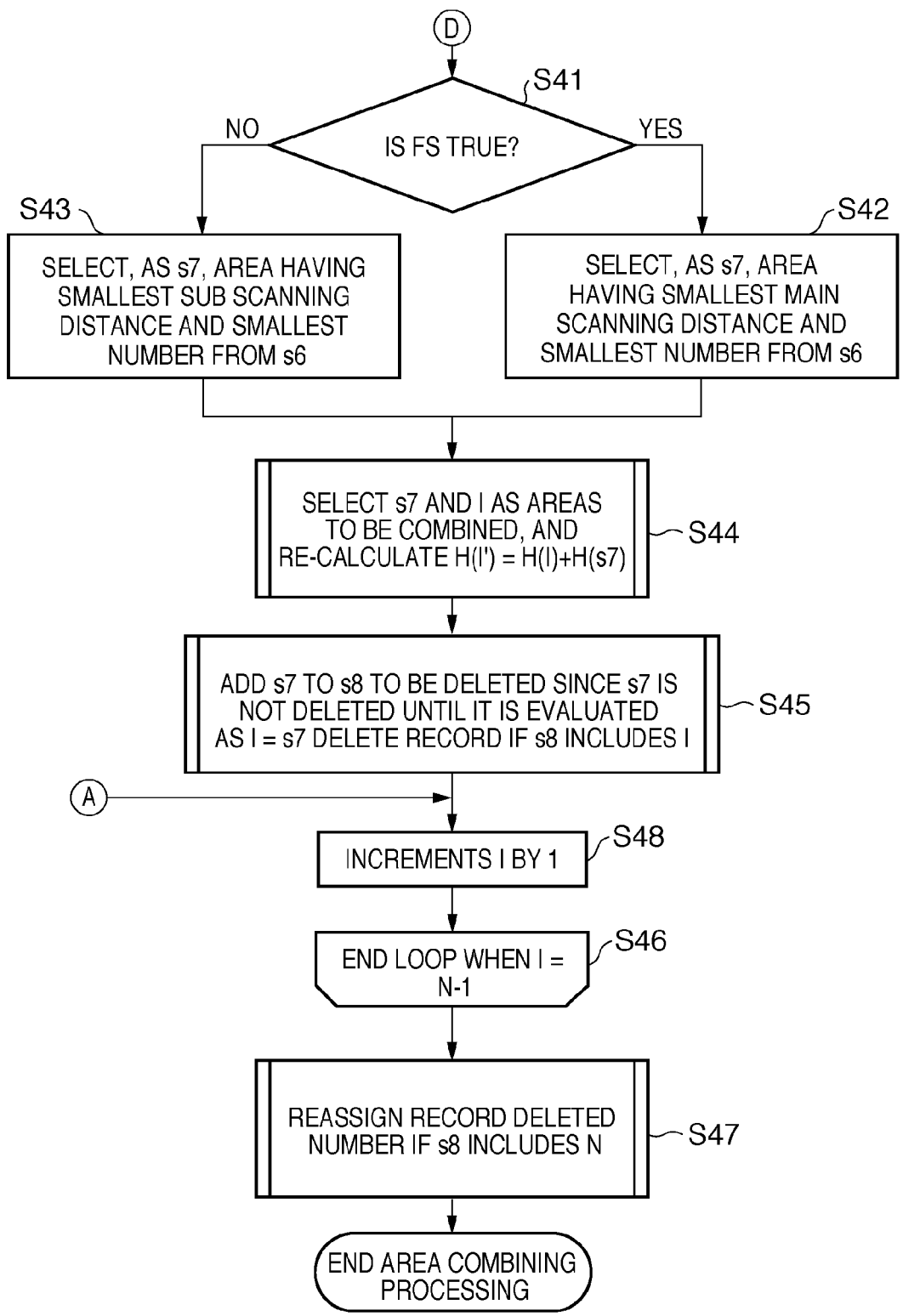

On the other hand, in FIGS. 11C and 11D, the areas 1101, 1102', and 1103 have the same width in the main scanning direction, the area 1102' has a height smaller than other areas, and the areas 1101 and 1102' are adjacent to each other in the main scanning direction but not in the sub scanning direction. The areas 1102' and 1103 are adjacent to each other in the sub scanning direction. A case will be explained below wherein the main scanning priority mode shown in FIG. 11C is set.

The areas 1101 and 1102' do not satisfy the combining condition. Hence, upon combining in the main scanning priority mode, it is determined that the areas 1101 and 1102' are not combined. Next, the areas 1102' and 1103 are adjacent to each other in the sub scanning direction. For this reason, it is determined that these areas 1102' and 1103 are combined.

Therefore, it is determined that the area 1101 and an area obtained by combining the areas 1102' and 1103 are laid out in the sub scanning direction, and these two areas include different contents.

A case will be described below wherein the sub scanning priority mode shown in FIG. 11D is set.

The areas 1101 and 1103 satisfy the combining condition in the sub scanning direction. Upon combining areas preferentially in the sub scanning direction, the areas 1101 and 1103 are combined to be laid out in the sub scanning direction. Next, a new area obtained by combining these areas 1101 and 1103 and the area 1102' are spaced apart from each other in the sub scanning direction. For this reason, it is determined that the area obtained by combining the areas 1101 and 1103 is not combined to the area 1102'. Therefore, it is determined that the area obtained by combining the areas 1101 and 1103 and the area 1102' are laid out in the main scanning direction, and these two areas include different contents. Note that FIGS. 11A to 11D have exemplified text areas. However, areas having an identical area type such as a line, image, or graphic are similarly combined.

[Details of Area Contents Combining Processing]

FIGS. 12A, 12B, 13A, and 13B are flowcharts for explaining the processing for combining areas in the MFP 100 according to this embodiment. Note that a program for implementing this processing is loaded from the HDD 2004 onto the RAM 2002 at the time of execution, and is executed under the control of the CPU 2001. Prior to the beginning of this processing, all parameters required for combining processing determination have been determined according to the flowchart shown in FIG. 5A. In this case, the table shown in FIG. 7A, which is generated in step S105, is used. Let N be the number of areas included in one page, Z be the image type for each area, X be the start position of an area in the main scanning direction, Y be the start position of the area in the sub scanning direction, W be the number of pixels of the area in the main scanning direction, and H be the number of pixels of the area in the sub scanning direction. Also, let RX and RY be the scan resolutions in the main and sub scanning directions upon scanning or storage (not shown). Let FS be a flag which is input in step S102 and indicates the main or sub scanning priority mode (main scanning priority if FS=ON). Let FT be a flag indicating if text areas alone are to be combined or other image and graphic areas are also to be combined. Let TSX, TSY, TEX, and TEY be the start and end positions of an area which is to undergo area determination. Let FC be a flag indicating whether or not to combine areas regardless of monochrome or color, and FF be a flag indicating whether or not to combine areas regardless of font types. Let DX and DY be maximum distances (millimeters) in the main and sub scanning directions between areas to be selected as those to be combined. Let DH be a maximum main scanning width difference (millimeters) between two areas to be selected as those to be combined. According to the aforementioned assumption, the area combining processing according to this embodiment will be described in detail below.

When the area combining processing is started in this way, the process advances to step S21 to start evaluation processing of areas in a number as large as the number (N−1) of areas in one page. Let I be an area whose evaluation is now in progress (initial value I=1), and parameters of the I-th area are described as (I). The process then advances to step S22 to check if a range of the I-th area (area I) in the main scanning direction falls within the combining target area. That is, the CPU 2001 checks if the positions and width (X(I), X(I)+W(I)) of the area I in the main scanning direction fall within a range between TSX and TEX which indicate the width in the main scanning direction of the target area that is to undergo area determination. If the area I does not fall within the target area, the CPU 2001 increments I by 1 in step S48, and the process returns to step S21 to evaluate the next area. If the area I falls within the range, the process advances from step S22 to step S23 to check if the range of the area I in the sub scanning direction falls within the combining target area. That is, the CPU 2001 checks if the positions and width (Y(I), Y(I)+H(I)) of the area I in the sub scanning direction fall within a range between TSY and TEY which indicate the width in the sub scanning direction of the target area that is to undergo area determination. If the area I does not fall within the range, the CPU 2001 increments I by 1 in step S48, and the process returns to step S21 to evaluate the next area.

If it is determined in step S23 that the area I falls within the range, the process advances to step S24 to check if there are subsequent areas, that is, the {(I+1)-th to N-th} areas, whose type matches that (Z(I)) of the area I. If there is no area whose type matches, the CPU 2001 increments I by 1 in step S48, and the process returns to step S21 to evaluate the next area.

If it is determined in step S24 that there are areas whose type matches, the process advances to step S25, and the CPU 2001 saves a set of the IDs of areas that match the combining condition as a set S1. The process then advances to step S26. In step S26, the CPU 2001 makes a calculation for converting an error range of the width in the main scanning direction between areas from millimeters to the number of pixels. The CPU 2001 uses the following equation. With this equation, the CPU 2001 calculates based on the degree DH(I) indicating the maximum main scanning width difference (millimeters) between areas to be selected as those to be combined, and the resolution RX of this area in the main scanning direction.

$$\text{Number of pixels} = [\text{given length (millimeters)}] \times [\text{resolution (dpi)}]/25.4$$

The process then advances to step S27 to check if the set S1 includes areas whose width in the main scanning direction are nearly equal to that of the area I. That is, the CPU 2001 checks if the set S1 includes areas each of which has the width in the main scanning direction within the range DH(I) in which an error is allowable with respect to the number W(I) of pixels of the area I in the main scanning direction. If such area is not found, the CPU 2001 increments I by 1 in step S48, and the process returns to step S21 to evaluate the next area.

If such areas are found in step S27, the process advances to step S28. In step S28, the CPU 2001 saves a set of the IDs of areas that match the combining condition as a set S2, and the process then advances to step S29. That is, in step S28 the CPU 2001 calculates the set S2 of areas, whose type and width in the main scanning direction satisfy the condition, of those included in the set S1. In step S29, the CPU 2001 makes the aforementioned calculation for converting from millimeters into the number of pixels, so as to check if the distance in the main scanning direction between areas satisfies the combining condition. In this case, the CPU 2001 calculates the number of pixels based on the degree DX(I) indicating the maximum distance in the main scanning direction between areas to be selected as those to be combined, and the resolution RX in the main scanning direction. The process then advances to step S30. The CPU 2001 checks in step S30 if the set S2 includes areas having the main scanning positions falling within a designated range from the main scanning position of the area I. That is, the CPU 2001 checks if the set S2 includes areas falling within the main scanning position range {X(I)+W(I)±DX(I)} of the area I. If no such area is found, the process advances to step S48 to increment I by 1, and the process then returns to step S21 to evaluate the next area.

On the other hand, if areas falling within the range of the area I are found in step S30, the process advances to step S31. In step S31, the CPU 2001 saves a set of the IDs of areas that match the combining condition of those in the set S2 as a set S3, and the process advances to step S32. In step S32, the CPU 2001 makes the aforementioned calculation for converting the distance in the sub scanning direction between areas from millimeters into the number of pixels, and the process advances to step S33. That is, in this case, the CPU 2001 calculates the number of pixels based on the degree DY(I) indicating the maximum distance in the sub scanning direction between areas to be selected as those to be combined, and the resolution RY in the sub scanning direction.

The CPU 2001 checks in step S33 if the set S3 includes areas having the sub scanning positions falling within a designated range from the sub scanning position of the area I. That is, the CPU 2001 checks if the set S3 includes areas falling within the sub scanning position range {Y(I)+H(I)±DY(I)}. If no such area is found, the process advances to step S48 to increment I by 1, and the process then returns to step S21 to evaluate the next area.

On the other hand, if areas falling within the range in the sub scanning direction from the area I are found in step S33, the process advances to step S34. In step S34, the CPU 2001 saves a set of the IDs of areas that match the combining condition of those in the set S3 as a set S4, and the process then advances to step S35 (FIG. 13). The CPU 2001 checks in step S35 if the area to be evaluated is a text area to be combined, or the setting that allows combining areas other than a text area (FT=true) is selected and the area to be evaluated is other than a text area. If the area to be evaluated is other than a text area, and the setting that limits areas to be combined to text areas alone (FT=false) is selected, the CPU 2001 increments I by 1 in step S48, and the process returns to step S21 to evaluate the next area.

On the other hand, if the area to be evaluated is other than a text area in step S35, the process advances to step S36 to substitute the set S4 in a set S6, and the process then jumps to step S41. If the area to be evaluated is a text area, the process advances to step S37 to check if the set S4 includes areas which have the setting that considers the color attribute (FC=false), and also the color attribute which matches that of the text area to be evaluated. If the set S4 does not include any area having the same color attribute as that of the area to be evaluated, and the setting that allows combining areas in consideration of the color attribute, the CPU 2001 increments I by 1 in step S48, and the process returns to step S21 to evaluate the next area.

On the other hand, if the setting that does not consider a color attribute is selected or the set S4 includes areas having the same color attribute as that of the area to be evaluated in step S37, the process advances to step S38 to save a set of the IDs of areas that match the combining condition as a set S5, and the process then advances to step S39. The CPU 2001 checks in step S39 if the set S5 includes areas which have the setting that considers the font type attribute (FF=false) and also the font type attribute which matches that of the text area to be evaluated. If the set S5 does not include any area having the same font type attribute as that of the area to be evaluated, and the setting that allows to combine areas in consideration of the font type attribute is selected, the CPU 2001 increments I by 1 in step S48, and the process returns to step S21 to evaluate the next area.

On the other hand, if the setting that does not consider a font type attribute is selected, or the set S5 includes areas having the same font type attribute as that of the area to be evaluated in step S39, the process advances to step S40. In step S40, the CPU 2001 saves a set of the IDs of areas that match the combining condition as a set S6, and the process advances to step S41.

The CPU 2001 checks in step S41 if areas are to be combined preferentially in the main scanning direction (FS=true) or in the sub scanning direction (FS=false). If the main scanning priority mode is selected, the process advances to step S42. In step S42, the CPU 2001 selects one area which has the smallest main scanning distance and the smallest number from the set S6, and saves it as a set S7.

On the other hand, if the sub scanning priority mode is selected, the process advances to step S43. In step S43, the CPU 2001 selects one area which has the smallest sub scanning distance and the smallest number from the set S6, and saves it as a set S7. After execution of step S42 or S43, the process advances to step S44, and the CPU 2001 calculates a new height upon combining the area of the set S7 and the area to be evaluated as the sum of the heights of these areas. That is, the CPU 2001 adds the height H(S7) of the area of the set S7 to the height H(I) of the area I to calculate the height H(I') of the new combined area.

The process then advances to step S45, and the CPU 2001 saves the area included in the set S7 selected as an area to be combined in a set S8 as an area to be deleted. In this case, if the area to be evaluated is included in the set S8, the CPU 2001 deletes the record that holds respective attributes of the area to be evaluated.

The process advances to step S46 to check if the number of areas to be evaluated reaches the total number N. If areas in a number as large as the total number N are not evaluated yet, the CPU 2001 increments I by 1 in step S48, and the process returns to step S21 to evaluate the next area. If all the areas have been evaluated, the process advances to step S47 to re-assign numbers in turn from 1 to shift the number of the deleted record. In addition, if the set of the record to be deleted includes the last area, the CPU 2001 deletes the record that holds respective attributes of the last area. In this way, after the area combining determination processing for all the areas and reassignment of the numbers of respective areas are complete, this processing ends.

[Overview of Area Contents Print Processing]

FIG. 14 is a flowchart for explaining an overview of the processing upon printing area contents by the MFP 100 according to this embodiment.

In step S51, the operator inputs an operation instruction of the image processing method according to this embodiment (area contents output mode) by operating a standby window via the console 2006. The process advances to step S52, and the operator selects a document to be printed. Reference numeral 1400 denotes an example of a document selection window displayed on the display unit 3001. Each meta information displayed as an icon of the document information is stored in the MFP 100. After the document is selected, the process advances to step S53, and the CPU 2001 acquires data from the storage destination in the meta information using a database manipulation language such as SQL or the like. The CPU 2001 applies decoding processing to image areas of the acquired data to generate raster images of original areas. On the other hand, the CPU 2001 applies rendering processing to text areas in consideration of the font types and color attributes to generate raster images of original areas. The process then advances to step S54. In step S54, the CPU 2001 renders the raster images to page images by dividing the raster images into pages in the sub scanning direction to generate print image data of respective pages, and executes print processing.

[Overview of Area Contents Image Forming Processing]

Figure 15B:
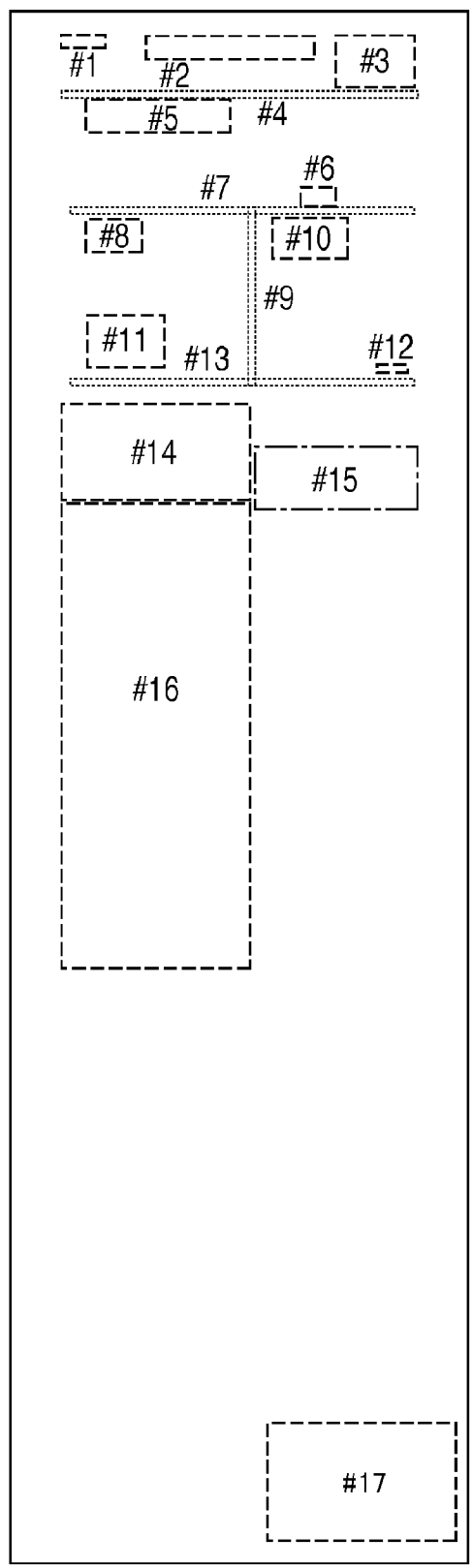

FIGS. 15A to 15C are views for explaining an overview of the processing for obtaining print image data when area contents are edited in the database and their data sizes are changed in the MFP 100 according to this embodiment.

FIG. 15A shows an example of meta information of an image held by the MFP 100, and shows an example in which it is detected from the DB as the commit destination that meta information of area #16 has been updated. In FIG. 15A, the Y-coordinate (the coordinate in the sub scanning direction) of each area is stored as a coordinate relative to the Y-coordinate of the previous area.

In FIG. 15B, when the text size of an area (#16 in this case) is increased, the size in the main scanning direction is fixed. For this reason, the area is enlarged in the height (sub scanning) direction. In this case, if the positions of respective areas are fixed, the enlarged area may overlap other areas, thus collapsing the layout.

However, in this embodiment, the position in the sub scanning direction between areas is held as a relative coordinate. In this way, areas and their contents are determined, as shown in FIG. 15B. After that, upon laying out and printing contents for respective pages, as shown in FIG. 15C, an output result can be obtained without any overlaps between areas and without largely collapsing the layout. Although not shown, in case of a photo, line image, or table, that photo or image may be fit into an area having the same size as that before updating without enlarging the area in the sub scanning direction.

After the positions and sizes of respective areas are determined, the CPU 2001 acquires contents by reading them out of the area of interest from the database 105. If the acquired contents are text information, the CPU 2001 renders the character information with reference to the character font type, character size, color attribute, and the like based on the held meta information. In this case, the CPU 2001 lays out data of the text area to extend in the sub scanning direction without changing the size in the main scanning direction. The CPU 2001 copies a raster image generated by rendering in this way to the RAM 2002, and calculates the sub scanning start position of the next area. In case of a photo, line image, or table, the CPU 2001 executes decoding processing to generate a raster image, changes the scale of the raster image to fit the area size, and copies that image to the RAM 2002. The CPU 2001 then calculates the sub scanning start position of the next area. After image data is generated on the RAM 2002 in this way, the CPU 2001 divides the image data into pages to generate print image data (see FIG. 15C). When a blank space is generated at the top of a page upon dividing print data into pages like area #17 in FIG. 15C, the CPU 2001 may apply image processing after it removes that blank space.

(Other Embodiments)

The embodiments of the present invention have been explained in detail. The present invention may be applied to either a system constituted by a plurality of devices, or an apparatus consisting of a single device.

Note that the present invention can also be achieved by directly or remotely supplying a program of software that implements the functions of the aforementioned embodiments to a system or apparatus, and reading out and executing the supplied program code by a computer of that system or apparatus. In this case, the form of program is not particularly limited as long as it has the program function.

Therefore, the program code itself installed in a computer to implement the functional processing of the present invention using the computer implements the present invention. That is, the claims of the present invention include the computer program itself for implementing the functional processing of the present invention. In this case, the form of program is not particularly limited, and an object code, a program to be executed by an interpreter, script data to be supplied to an OS, and the like may be used as long as they have the program function.

As a recording medium for supplying the program, various media can be used: for example, a floppy® disk, hard disk, optical disk, magneto-optical disk, MO, CD-ROM, CD-R, CD-RW, magnetic tape, nonvolatile memory card, ROM, DVD (DVD-ROM, DVD-R), and the like.

As another program supply method, a program can be supplied by establishing a connection to a homepage on the Internet using a browser on a client computer, and downloading the program from the homepage to a recording medium such as a hard disk or the like. In this case, the program to be downloaded may be either the computer program itself of the present invention or a compressed file including an automatic installation function. Furthermore, the program code that configures the program of the present invention may be segmented into a plurality of files, which may be downloaded from different homepages. That is, the claims of the present invention include a WWW server which makes a plurality of users download a program file required to implement the functional processing of the present invention by a computer.

Also, a storage medium such as a CD-ROM or the like, which stores the encrypted program of the present invention, may be delivered to the user. In this case, the user who has cleared a predetermined condition may be allowed to download key information that decrypts the encrypted program from a homepage via the Internet, so as to install the encrypted program in a computer in an executable form using that key information.

The functions of the aforementioned embodiments may be implemented by a mode other than that by executing the readout program code by the computer. For example, an OS or the like running on the computer may execute some or all of actual processes based on an instruction of that program, thereby implementing the functions of the aforementioned embodiments.

Furthermore, the program read out from the recording medium may be written in a memory equipped on a function expansion board or a function expansion unit, which is inserted into or connected to the computer. In this case, after the program is written in the memory, a CPU or the like equipped on the function expansion board or unit executes some or all of actual processes based on the instruction of that program, thereby implementing the functions of the aforementioned embodiments.

According to the present invention, each page image of image data including a plurality of pages is divided into a plurality of areas according to the types of partial images included in that image, and a combining condition including a direction to retrieve areas to be combined from these plurality of areas is set. Two or more areas can be combined according to that combining condition. An image including the combined area can be rendered to images for respective pages, and the rendered images can be output.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-181446 filed on Jul. 10, 2007, which is hereby incorporated by reference herein in its entirety.

What is claimed is:

1. An image processing apparatus comprising:
    a dividing unit configured to divide an image of a document into a plurality of areas, including a first area and a second area;
    a setting unit configured to set a direction based on input of a user for determining the second area, when associating the first and second areas as a continuous group, wherein the direction is a direction of character string included in the document or a direction orthogonal to the direction of character string;
    an area associating unit configured to specify, in a case where a plurality of areas neighbor the first area, an area in the direction set by the setting unit from among the plurality of areas neighboring the first area as the second area, and in a case where one area neighbors the first area, the one area as the second area regardless of the direction set by the setting unit, and associate the specified area with the first area as the continuous group; and
    a storage unit configured to store information of the associated areas.

2. The apparatus according to claim 1, wherein:
    the setting unit further sets a type of an area, and
    the area associating unit associates the second area with the first area when the second area is the same type as the first area.

3. The apparatus according to claim 1, wherein:
    the dividing unit divides images of each of a plurality of documents, including a first document and a second document, into a plurality of areas, and
    the area associating unit associates an area divided from the first document with an area divided from the second document.

4. The apparatus according to claim 2, wherein the storage unit stores at least a character font, a character size, and color information of a character when the type of an area indicates a text area.

5. The apparatus according to claim 1, wherein the storage unit stores a coordinate position of each area as a relative coordinate position with respect to a specific area.

6. The apparatus according to claim 1, further comprising a rendering unit configured to render the image including the areas associated by the area associating unit to respective page images of the image based on the information stored in the storage unit.

7. A method of dividing an image of a document into a plurality of areas with an image processing apparatus, the method comprising:
    a dividing step of dividing an image of a document into a plurality of areas, including a first area and a second area;
    a setting step of setting a direction based on input of a user for determining the second area, when associating the first area with the second area as a continuous group, wherein the direction is a direction of character string included in the document or a direction orthogonal to the direction of character string;
    an area associating step of specifying, in a case where a plurality of areas neighbor the first area, an area in the direction set by the setting unit from the plurality of areas neighboring the first area as the second area, and in a case where one area neighbors the first area, the one area as the second area regardless of the direction set by the setting unit, and associating the specified area with the first area as the continuous group; and
    a storing step of storing information of the associated areas in a storage unit,
    wherein the image forming apparatus has a processor that executes the dividing step, the setting step, the area associating step, and the storing step.

* * * * *